United States Patent
Hasegawa et al.

(10) Patent No.: US 10,978,801 B2
(45) Date of Patent: Apr. 13, 2021

(54) PHASED ARRAY ANTENNA

(71) Applicant: FUJIKURA LTD., Tokyo (JP)

(72) Inventors: Yuta Hasegawa, Sakura (JP); Ning Guan, Sakura (JP)

(73) Assignee: FUJIKURA LTD., Tokyo (JP)

( * ) Notice: Subject to any disclaimer, the term of this patent is extended or adjusted under 35 U.S.C. 154(b) by 423 days.

(21) Appl. No.: 15/776,274

(22) PCT Filed: Sep. 13, 2016

(86) PCT No.: PCT/JP2016/077009
§ 371 (c)(1),
(2) Date: May 15, 2018

(87) PCT Pub. No.: WO2017/090301
PCT Pub. Date: Jun. 1, 2017

(65) Prior Publication Data
US 2020/0259255 A1    Aug. 13, 2020

(30) Foreign Application Priority Data
Nov. 25, 2015 (JP) .............................. JP2015-229843

(51) Int. Cl.
*H01Q 3/26* (2006.01)
*H04B 10/2575* (2013.01)

(52) U.S. Cl.
CPC ......... *H01Q 3/2676* (2013.01); *H01Q 3/2682* (2013.01); *H04B 10/25752* (2013.01); *H04B 2210/006* (2013.01)

(58) Field of Classification Search
CPC .............. H01Q 3/2682; H01Q 3/2676; H04B 2210/006; H04B 10/25752
See application file for complete search history.

(56) References Cited

U.S. PATENT DOCUMENTS

| 5,510,927 A | 4/1996 | Noe |
| 6,181,955 B1 | 1/2001 | Dartois |

(Continued)

FOREIGN PATENT DOCUMENTS

| CN | 1735998 A | 2/2006 |
| CN | 102664684 A | 9/2012 |

(Continued)

OTHER PUBLICATIONS

Extended (supplementary) European Search Report dated Oct. 19, 2018, issued in counterpart European Application No. 16868250.8. (18 pages).

(Continued)

*Primary Examiner* — Ricardo I Magallanes
(74) *Attorney, Agent, or Firm* — Westerman, Hattori, Daniels & Adrian, LLP

(57) ABSTRACT

Provided is a phased array antenna which can be used in the millimeter wave band and whose cost is lower than that of a conventional phased array antenna. The phased array antenna (1) includes: an optical modulator (OM) configured to generate a signal light beam SL by carrying out intensity modulation on a carrier light beam CL by use of a sum signal $V_{IF+LO}(t)$, the sum signal $V_{IF+LO}(t)$ being obtained by adding an intermediate frequency signal $V_{IF}(t)$ and a local signal $V_{LO}(t)$; and a time delay device (TD) configured to generate delayed signal light beams SL'1, SL'2, ... and SL'n by imparting time delays $\Delta t1, \Delta t2, ...$ and $\Delta tn$ to the signal light beam SL. Each feeding circuit (Fi) generates, from a corresponding delayed signal light beam SL'i, a delayed radio frequency signal $V_{RF}(t-\Delta ti)$ to be supplied to an antenna element (Ai).

8 Claims, 15 Drawing Sheets

(56) References Cited

U.S. PATENT DOCUMENTS

| | | |
|---|---|---|
| 6,448,938 B1 | 9/2002 | Chiang et al. |
| 7,043,271 B1 | 5/2006 | Seto et al. |
| 9,172,569 B2 | 10/2015 | Leenaerts et al. |
| 2003/0035183 A1 | 2/2003 | Seto et al. |
| 2006/0079290 A1 | 4/2006 | Seto et al. |
| 2007/0058975 A1 | 3/2007 | Sasai et al. |
| 2012/0256805 A1 | 10/2012 | Orihashi |
| 2012/0319746 A1 | 12/2012 | Hayashi et al. |
| 2015/0003565 A1 | 1/2015 | George et al. |

FOREIGN PATENT DOCUMENTS

| | | | |
|---|---|---|---|
| CN | 102856665 | A | 1/2013 |
| CN | 103401072 | A | 11/2013 |
| EP | 2544301 | A1 | 1/2013 |
| JP | 2001-85925 | A | 3/2001 |
| JP | 2004-23400 | A | 1/2004 |
| JP | 2007-67802 | A | 3/2007 |
| JP | 2007-165956 | A | 6/2007 |
| JP | 2010-166291 | A | 7/2010 |
| JP | 2014-96637 | A | 5/2014 |
| WO | 2011/078029 | A1 | 6/2011 |
| WO | 2011/108397 | A1 | 9/2011 |

OTHER PUBLICATIONS

Non-Final Office Action dated Jun. 23, 2020, issued in U.S. Appl. No. 15/771,546. (30 pages).

Tong, D.T.K. et al., "A Novel Multiwavelength Optically Controlled Phased Array Antenna with a Programmable Dispersion Matrix", IEEE Photonics Technology Letters, Jun. 1996, vol. 8, No. 6, pp. 812-814.

Tulchinsky, D. A. et al., "Ultrawide-Band Fiber-Optic Control of a Millimeter-Wave Transmit Beamformer", IEEE Transactions on Microwave Theory and Techniques, Jul. 2001, vol. 49, No. 7, pp. 1248-1253.

McKenna, T. P. et al., "Photonic Beamsteering of a Millimeter-Wave Array with 10-Gb/s Data Transmission", IEEE Photonics Technology Letters, Jul. 15, 2014, vol. 26, No. 14, pp. 1407-1410.

Decision to Grant a Patent dated Feb. 5, 2019, issued in counterpart JP Application No. 2017-552296, with English machine translation. (4 pages).

Ehyaie, D., "Novel Approaches to the Design of Phased Array Antennas", Jan. 1, 2011, retrieved from the Internet; cited in Extended (supplementary) European Search Report dated Aug. 6, 2018. (153 pages).

Extended (supplementary) European Search Report dated Aug. 6, 2018, issued in related European Application No. 16861856.9. (7 pages).

PHASED ARRAY ANTENNA

TECHNICAL FIELD

The present invention relates to a phased array antenna.

BACKGROUND ART

In an attempt to increase capacity of wireless communications, frequency bands used are increasingly in a broader frequency range as well as in a higher frequency region. In recent years, not only a microwave band (not less than 0.3 GHz and not more than 30 GHz) but also a millimeter wave band (not less than 30 GHz and not more than 300 GHz) is used in wireless communications. In particular, 60 GHz band, in which a great attenuation occurs in the atmosphere, is attracting attention as a band in which data leakage is less likely to occur.

An antenna which is used in a wireless communication in 60 GHz band is expected to have a high gain and to operate in a wide frequency band. This is because a great attenuation occurs in 60 GHz band in the atmosphere, as described above. An array antenna is one example of an antenna which has a gain high enough to allow the antenna to be used in 60 GHz band. Note here that "array antenna" refers to an antenna in which a plurality of antenna elements are arranged in an array or in matrix.

In the array antenna, a direction of a main beam of radiated electromagnetic waves can be changed by controlling a phase of a radio frequency signal (RF signal) supplied to each of the plurality of antenna elements. The array antenna having such a beam scanning function is called a phased array antenna, and has been a subject of vigorous research and development.

FIG. 11 illustrates a typical configuration of a conventional phased array antenna. As illustrated in FIG. 11, the conventional phased array antenna is configured so as to (1) impart a time delay to a radio frequency signal RF by use of time delay elements TD1 through TD4 and (2) supply delayed radio frequency signals RF'1 through RF'4 to antenna elements A1 through A4.

However, the phased array antenna shown in FIG. 11 is not suitable for use in a millimeter wave band. This is because it is difficult to impart a highly accurate time delay to a radio frequency signal in a millimeter wave band with use of an electrical means such as a time delay element.

For this reason, a phased array antenna to be used in the millimeter wave band is normally configured to use an optical means, such as a chromatically dispersive fiber, to impart a highly accurate time delay to radio frequency signal. FIGS. 12 and 13 illustrate such a phased array antenna.

A phased array antenna 101 illustrated in FIG. 12 includes light sources LS1 through LS4, an optical multiplexer OMP, an optical modulator OM, an optical waveguide OWG, a wavelength demultiplexer WDM, O/E converters OE1 through OE4, and antenna elements A1 through A4. An optical waveguide constituted by a chromatic dispersion medium is used as the optical waveguide OMG. The phased array antenna 101 is configured so as to generate radio frequency signals RF'1 through RF'4, which have differing time delays $\Delta t1$ through $\Delta t4$ respectively imparted thereto. This is accomplished in the following manner.

(1) Generate (by use of an optical multiplexer OMP) a carrier light beam CL by multiplexing carrier light beams CL1 through CL4, each of which has differing wavelengths.
(2) Generate (by use of an optical modulator OM) a signal light beam SL by carrying out intensity modulation on the carrier light beam CL by use of a radio frequency signal RF.
(3) Generate (by use of an optical waveguide OMG) a delayed signal light beam SL' by causing chromatic dispersion $\Delta D(\lambda)$ of the signal light beam SL. (4) Generate (by use of a wavelength demultiplexer WDM) delayed signal light beams SL'1 through SL'4 by carrying out wavelength demultiplexing on the delayed signal light beam SL'. (5) Generate (by use of O/E converters OE1 through OE4) delayed radio frequency signals RF'1 through RF'4 by carrying out O/E conversion on the delayed signal light beams SL'1 through SL'4.

In the phased array antenna 101 illustrated in FIG. 12, the time delays $\Delta t1$ through $\Delta t4$ which are imparted to the radio frequency signals RF'1 through RF'4, respectively, are changed by changing the wavelengths of the carrier light beams CL1 through CL4. This makes it possible to control the direction of a main beam (see Patent Literature 1). Alternatively, controlling the direction of the main beam can be achieved by changing the chromatic dispersion $\Delta D(\lambda)$ caused to the signal light beam SL so as to change the time delays $\Delta t1$ through $\Delta t4$ which are imparted to the radio frequency signals RF'1 through RF'4, respectively (see Non-Patent Literature 1).

A phased array antenna 102 illustrated in FIG. 13 includes a light source LS, an optical modulator OM, an optical splitter OD, optical waveguides OWG1 through OWG4, O/E converters OE1 through OE4, and antenna elements A1 through A4. The optical waveguides OWG1 through OWG4 are optical waveguides which cause differing chromatic dispersion or are optical waveguides having differing optical path lengths. The phased array antenna 102 is configured so as to generate radio frequency signals RF'1 through RF'4, which have differing time delays $\Delta t1$ through $\Delta t4$ respectively imparted thereto. This is accomplished in the following manner.

(1) Generate (by use of an optical modulator OM) a signal light beam SL by carrying out intensity modulation on the carrier light beam CL by use of a radio frequency signal RF.
(2) Generate (by use of an optical splitter OD) signal light beams SL1 through SL4 by splitting the signal light beam SL. (3) Generate (by use of OWG1 through OWG4) delayed signal light beams SL'1 through SL'4 by imparting the time delays $\Delta t1$ through $\Delta t4$ to the signal light beams SL1 through SL4, respectively. (4) Generate (by use of O/E converters E1 through OE4) delayed radio frequency signals RF'1 through RF'4 by carrying out O/E conversion on the delayed signal light beams SL'1 through SL'4.

In a case where the optical waveguides OWG1 through OWG4 are waveguides which cause differing chromatic dispersion, the time delays $\Delta t1$ through $\Delta t4$ which are imparted to the radio frequency signals RF'1 through RF'4, respectively, are changed by changing the wavelength of the carrier light beam CL. This makes it possible to control the direction of a main beam (see Patent Literature 2). In a case where the optical waveguides OWG1 through OWG4 are optical waveguides which have differing optical path lengths, the time delays $\Delta t1$ through $\Delta t4$ which are imparted to the radio frequency signals RF'1 through RF'4, respectively, are changed by changing the optical path lengths of the optical waveguides OWG1 through OWG4. This makes it possible to control the direction of a main beam (see Non-Patent Literatures 2 and 3).

CITATION LIST

Patent Literature

[Patent Literature 1]
Japanese Patent Application Publication, Tokukai, No. 2007-165956
[Patent Literature 2]
Japanese Patent Application Publication, Tokukai, No. 2004-23400
[Patent Literature 3]
Japanese Patent Application Publication, Tokukai, No. 2001-85925

Non-Patent Literature

[Non-patent Literature 1]
Dennis T. K. Tong and Ming C. Wu, 'A Novel Multiwavelength Optically Controlled Phased Array Antenna with a Programmable Dispersion Matrix', IEEE PHOTONICS TECHNOLOGY LETTERS, VOL. 8, NO. 6, JUNE 1996
[Non-patent Literature 2]
David A. Tulchinsky and Paul J. Matthews, 'Ultrawide-Band Fiber-Optics Control of a Millimeter-Wave Transmit Beamformer', IEEE TRANSACTIONS ON MICROWAVE THEORY AND THECHNIQUES, VOL. 49, NO. 7, JULY 2001
[Non-patent Literature 3]
Timothy P. McKenna, Jeffery A. Nanzer and Thomas R. Clark Jr., 'Photonic Beamstreering of a Millimeter-Wave Array With 10-Gb/s Data Transmission'IEEE PHOTONICS TECHNOLOGY LETTERS, Vol. 26, NO. 14, JULY 2014

SUMMARY OF INVENTION

Technical Problem

However, in a case where an optical means is employed for imparting delay to a radio frequency signal, as is done in the conventional phased array antennas 101 and 102 illustrated in FIGS. 12 and 13, there will be an unavoidable increase in cost. This is because in such a case it becomes necessary to use optical components, which are costly in comparison to electronic components. A great increase in cost is to be expected particularly if such a phased array antenna is to be used in the millimeter wave band, because in such a case it is necessary to use an expensive or difficult-to-obtain optical modulator, O/E converter, and the like.

The present invention has been made in view of the above problems. An object of an embodiment of the present invention is to provide a phased array antenna which can be used in the millimeter wave band and whose cost is lower than that of a conventional phased array antenna.

Solution to Problem

In order to solve the above problems, a phased array antenna in accordance with the present invention includes: n (n is an integer of 2 or more) antenna elements A1, A2, . . . and An; a multiplexer configured to generate a sum signal $V_{IF+LO}(t)$ by adding an intermediate frequency signal $V_{IF}(t)$ and a local signal $V_{LO}(t)$; an optical modulator configured to generate a signal light beam SL by carrying out intensity modulation on a carrier light beam CL by use of the sum signal $V_{IF+LO}(t)$; a time delay device configured to generate delayed signal light beams SL'1, SL'2, . . . and SL'n by imparting time delays $\Delta t1, \Delta t2, \ldots$ and $\Delta tn$ to the signal light beam SL; and a feeding circuit group constituted by feeding circuits, each of which is a feeding circuit Fi configured to convert a corresponding delayed signal light beam SL'i into a delayed radio frequency signal $V_{RF}(t-\Delta ti)$ to be supplied to a corresponding antenna element Ai, each feeding circuit Fi (i=1, 2, . . . n) including: an O/E converter configured to generate a delayed sum signal $V_{IF+LO}(t-\Delta ti)$ by carrying out O/E conversion on the corresponding delayed signal light beam SL'i; a demultiplexer configured to generate a delayed intermediate frequency signal $V_{IF}(t-\Delta ti)$ and a delayed local signal $V_{LO}(t-\Delta ti)$ by demultiplexing the delayed sum signal $V_{IF+LO}(t-\Delta ti)$; and a mixer configured to generate the delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$.

Advantageous Effects of Invention

An embodiment of the present invention makes possible to provide a phased array antenna which can be used in the millimeter wave band and whose cost is lower than that of a conventional phased array antenna.

DESCRIPTION OF EMBODIMENTS

Embodiment 1

(Configuration of Phased Array Antenna)

Figure 1:
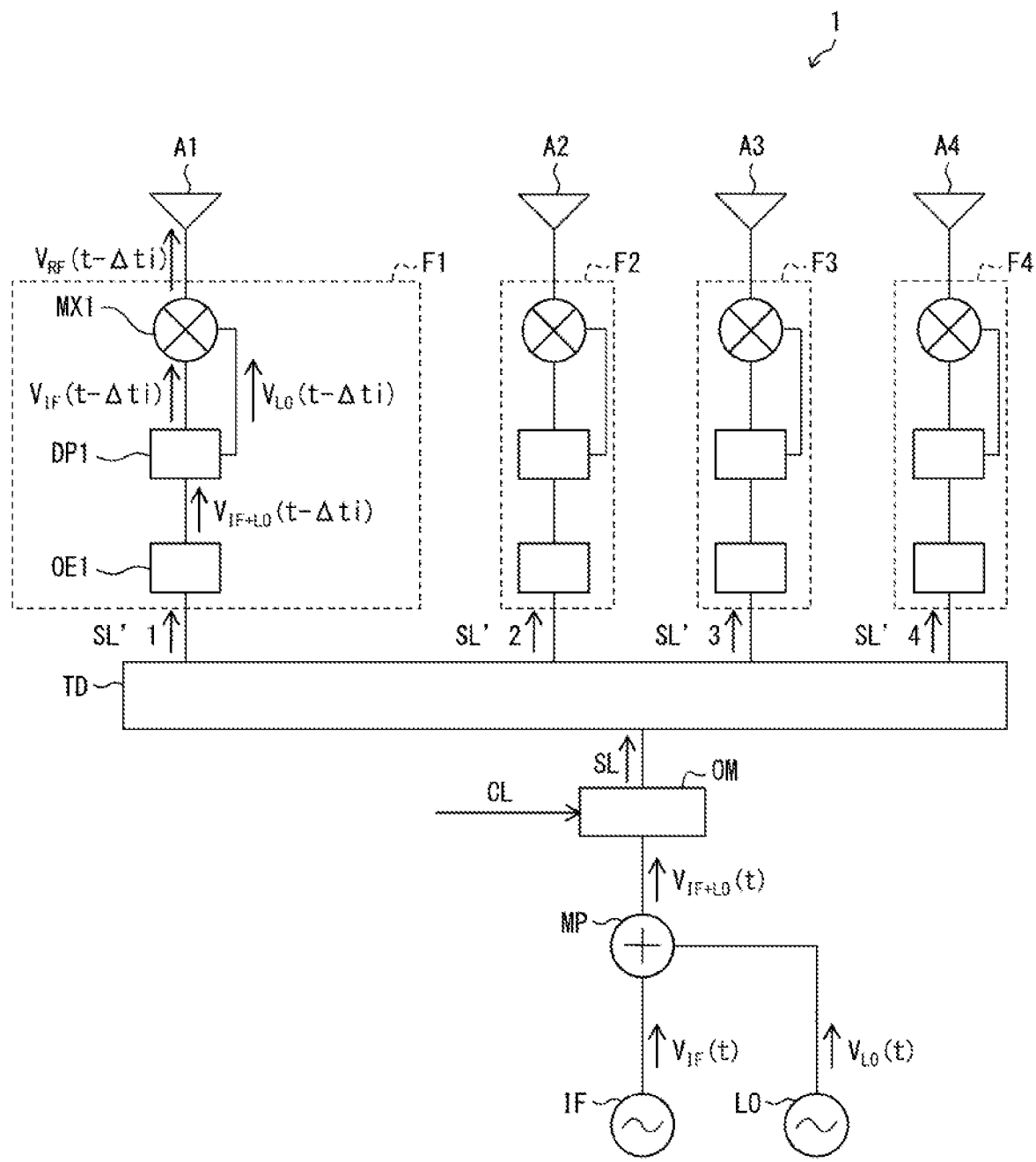
FIG. 1 is a block diagram illustrating a configuration of a phased array antenna in accordance with Embodiment 1 of the present invention.

The following description will discuss, with reference to FIG. 1, a phased array antenna 1 in accordance with Embodiment 1 of the present invention. FIG. 1 is a block diagram illustrating a configuration of the phased array antenna 1.

As illustrated in FIG. 1, the phased array antenna 1 is a transmitting antenna which includes: a multiplexer MP; an optical modulator OM; a time delay device TD; a feeding circuit group constituted by n feeding circuits F1, F2, . . . and Fn; and an antenna element group constituted by n antenna elements A1, A2, . . . and An. Note here that n represents any integer not less than 2; FIG. 1 illustrates a configuration where n=4.

The multiplexer MP adds an intermediate frequency signal $V_{IF}(t)$ and a local signal $V_{LO}(t)$ so as to generate a sum signal $V_{IF+LO}(t)$ which equals $V_{IF}(t)+V_{LO}(t)$. In a case where the intermediate frequency signal $V_{IF}(t)$ and the local signal $V_{LO}(t)$ are expressed as shown in Formula (1) and Formula (2), the sum signal $V_{IF+LO}(t)$ is expressed as shown in Formula (3). The sum signal $V_{IF+LO}(t)$ generated by the multiplexer MP is supplied to the optical modulator OM as a data signal.

[Math. 1]
$$V_{IF}(t)=V_1 \cos(2\pi f_{IF}(t+\theta_{IF})) \quad (1)$$

[Math. 2]
$$V_{LO}(t)=V_0 \cos(2\pi f_{LO}(t+\theta_{LO})) \quad (2)$$

[Math. 3]
$$V_{IF+LO}(t)=V_1 \cos(2\pi f_{IF}(t+\theta_{IF}))+V_0 \cos(2\pi f_{LO}(t+\theta_{LO})) \quad (3)$$

The optical modulator OM generates a signal light beam SL by carrying out intensity modulation on a carrier light beam CL by use of the sum signal $V_{IF+LO}(t)$. The signal light beam SL generated by the optical modulator OM is supplied to the time delay device TD. In Embodiment 1, a Mach-Zehnder (MZ) modulator is used as the optical modulator OM. A configuration of a light source which generates the carrier light beam CL will be discussed later with reference to another drawing.

The time delay device TD generates delayed signal light beams SL'1, SL'2, . . . and SL'n by imparting time delays $\Delta t1, \Delta t2, \ldots$ and $\Delta tn$ to the signal light beam SL. In other words, the time delay device TD generates delayed signal light beams from the signal light beam SL having the sum signal $V_{IF+LO}(t)$ superimposed thereon. Each of the delayed signal light beams is a delayed signal light beam SL'i having a delayed sum signal $V_{IF+LO}(t-\Delta ti)$ superimposed thereon. As described later, the time delay $\Delta ti$ imparted to each delayed signal light beam SL'i is set in accordance with the direction of a main beam of radiated electromagnetic waves. Each delayed signal light beam SL'i generated by the time delay device TD is supplied to a corresponding feeding circuit Fi. A configuration of the time delay device TD will be discussed later with reference to another drawing.

Each feeding circuit Fi (i=1, 2, . . . n) converts the corresponding delayed signal light beam SL'i into a delayed radio frequency signal $V_{RF}(t-\Delta ti)$. The delayed radio frequency signal $V_{RF}(t-\Delta ti)$ generated by each feeding circuit Fi is supplied to a corresponding antenna element Ai.

As illustrated in FIG. 1, each feeding circuit Fi includes an O/E converter OEi, a demultiplexer DPi, and a mixer MXi. Note that in FIG. 1, reference signs have been provided only for the O/E converter OE1, the demultiplexer DP1, and the mixer MX1 of feeding circuit F1 because each feeding circuit Fi is configurationally identical.

The O/E converter OEi generates a delayed sum signal $V_{IF+LO}(t-\Delta ti)$ by carrying out O/E conversion (photoelectric conversion) on the delayed signal light beam SL'i. The O/E converter OEi can be, for example, a photodiode. In a case where the sum signal $V_{IF+LO}(t)$ is expressed as in Formula (3), the delayed sum signal $V_{IF+LO}(t-\Delta ti)$ is expressed as shown in Formula (4).

[Math. 4]
$$V_{IF+LO}(t-\Delta ti)=V_1 \cos(2\pi f_{IF}(t-\Delta ti+\theta_{IF}))+V_0 \cos(2\pi f_{LO}(t-\Delta ti+\theta_{LO})) \quad (4)$$

The demultiplexer DPi generates a delayed intermediate frequency signal $V_{IF}(t-\Delta ti)$ and a delayed local signal $V_{LO}(t-\Delta ti)$ by demultiplexing the delayed sum signal $V_{IF+LO}(t-\Delta ti)$. In a case where the delayed sum signal $V_{IF+LO}(t-\Delta ti)$ is expressed as in Formula (4), the delayed intermediate frequency signal $V_{IF}(t-\Delta ti)$ and the delayed local signal $V_{LO}(t-\Delta ti)$ are expressed as shown in Formulas (5) and (6), respectively.

[Math. 5]
$$V_{IF}(t-\Delta ti)=V_1 \cos(2\pi f_{IF}(t-\Delta ti+\theta_{IF})) \quad (5)$$

[Math. 6]
$$V_{LO}(t-\Delta ti)=V_0 \cos(2\pi f_{LO}(t-\Delta ti+\theta_{LO}m)) \quad (6)$$

The mixer MXi generates a delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$. In a case where the delayed intermediate frequency signal $V_{IF}(t-\Delta ti)$ and the delayed local signal $V_{LO}(t-\Delta ti)$ are expressed as shown in Formula (5) and Formula (6), the delayed radio frequency signal $V_{RF}(t-\Delta ti)$ is expressed as shown in Formula (7).

[Math. 7]
$$V_{RF}(t-\Delta ti) = A \frac{V_0 V_1}{2} \cos\left(2\pi(f_{LO}+f_{IF})\left(t-\Delta ti+\frac{f_{LO}\theta_{LO}+f_{IF}\theta_{IF}}{f_{LO}+f_{IF}}\right)\right) \quad (7)$$

The time delay $\Delta ti$ in each delayed signal light beam SL'i can be set in a manner similar to that in a conventional phased array antenna. For example, in a case where the antenna elements A1, A2, . . . and An are arranged in this order along the same straight line, the time delay $\Delta ti$ in each delayed signal light beam SL'i can be set as shown in Formula (8), in accordance with the direction of the main beam of radiated electromagnetic waves. In Formula (8), c represents the speed of light, and di represents a distance between the antenna element A1 and an antenna element Ai. Furthermore, $\theta$ is an angle formed by (i) the straight line along which the antenna elements A1, A2, . . . and An are arranged and (ii) an equiphase plane of radiated electromagnetic waves.

[Math. 8]
$$\Delta ti = di \frac{\sin\theta}{c} \quad (8)$$

For example, in a case where an electromagnetic wave in the 60 GHz band (not less than 57 GHz and not more than 66 GHz) is radiated, a distance between adjacent ones of the antenna elements can, for example, be set to ½ of a free space wavelength corresponding to a center frequency of 61.5 GHz, that is, be set to 2.44 mm. In other words, the distance di between the antenna element A1 and the antenna element Ai can be set to 2.44×(i−1) mm. In this configuration, the time delay Δti in each delayed signal light beam SL'i can be set to 5.7×(i−1) ps in order to incline a radiation direction such that the angle θ becomes 45°, the angle θ being formed by (i) the straight line along which the antenna elements A1, A2, . . . and An are arranged and (ii) the equiphase plane of radiated electromagnetic waves.

In a case where an electromagnetic wave in the 70 GHz band (not less than 71 GHz and not more than 76 GHz) is radiated, a distance between adjacent ones of the antenna elements can, for example, be set to ½ of a free space wavelength corresponding to a center frequency of 73.5 GHz, that is, be set to 2.04 mm. In other words, the distance di between the antenna element A1 and the antenna element Ai can be set to 2.04×(i−1) mm. In this configuration, the time delay Δti in each delayed signal light beam SL'i can be set to 4.8×(i−1) ps in order to incline a radiation direction such that the angle θ becomes 45°, the angle θ being formed by (i) the straight line along which the antenna elements A1, A2, . . . and An are arranged and (ii) the equiphase plane of radiated electromagnetic waves.

A first noteworthy point of the phased array antenna 1 is that an amount of time delay in the delayed radio frequency signal $V_{RF}(t-\Delta ti)$ inputted into each antenna element Ai is not dependent on frequency. As such, with the phased array antenna 1, even if the frequency of radiated electromagnetic waves is changed, the electromagnetic waves can be radiated in a constant direction, without a change in the time delays $\Delta t1, \Delta t2, \ldots$ and $\Delta tn$ imparted to the signal light beam SL.

A second noteworthy point of the phased array antenna 1 is that the data signal modulated by the optical modulator OM is the sum signal $V_{IF+LO}(t)$ obtained by adding the intermediate frequency signal $V_{IF}(t)$ and the local signal $V_{LO}(t)$. This sum signal $V_{IF+LO}(t)$ has a frequency which is lower than that of the radio frequency signal. This makes it possible to provide a phased array antenna employing an easily-obtainable and/or low cost optical modulator, even in a case where the phased array antenna 1 operates in the millimeter wave band (radio frequency in a range from 30 GHz to 300 GHz).

Figure 14:
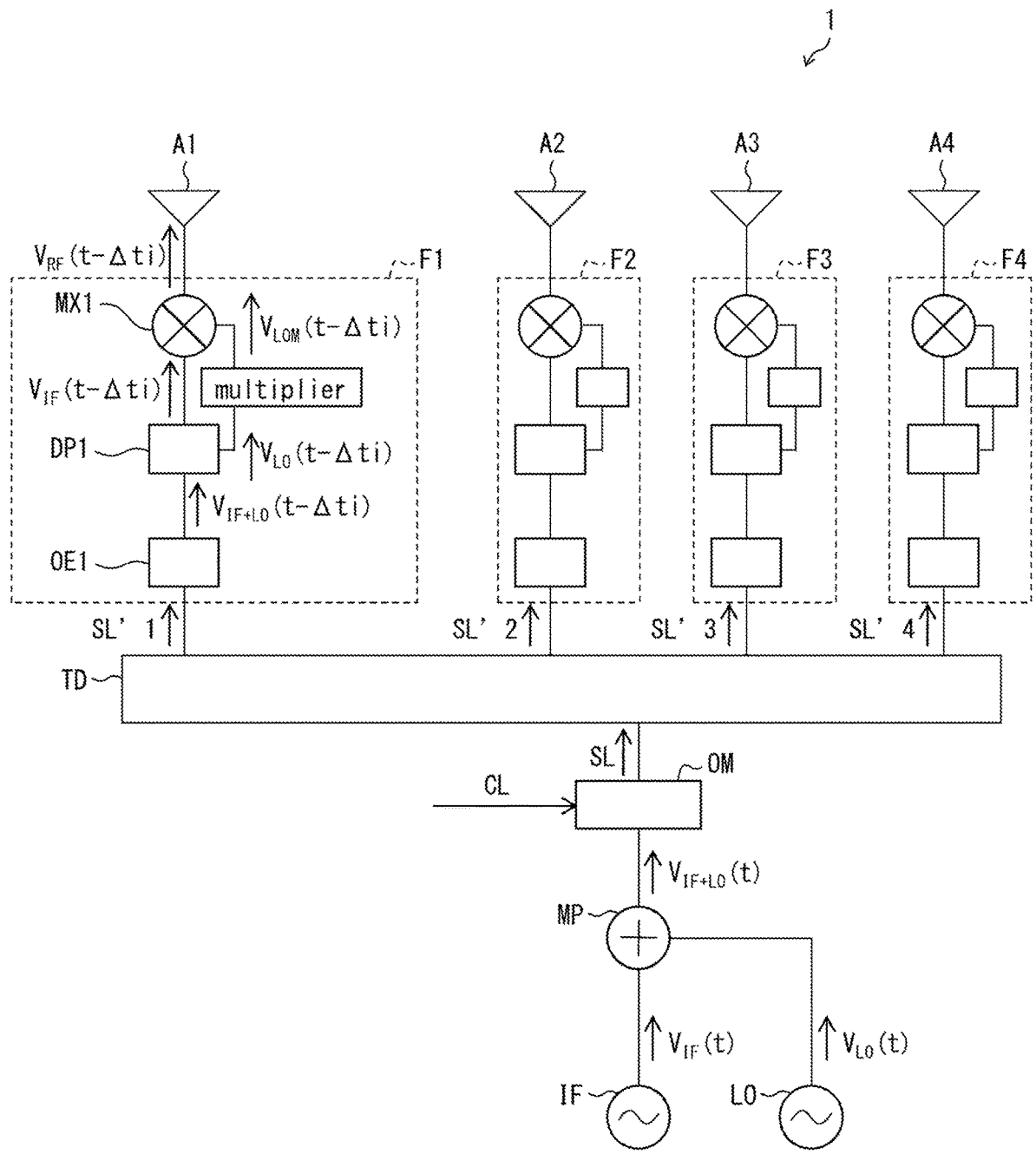
FIG. 14 is a block diagram illustrating a configuration of a phased array antenna in accordance with another aspect of Embodiment 1 of the present invention.

In each feeding circuit Fi, it is also possible to provide, between the demultiplexer DPi and the mixer MXi, a multiplier which multiplies the frequency of the delayed local signal $V_{LO}(t-\Delta ti)$ (for example, as illustrated in FIG. 14). In such a configuration, a delayed local signal $V_{LOM}(t-\Delta ti)$ inputted into the mixer MXi is expressed by Formula (9), and the delayed radio frequency signal $V_{RF}(t-\Delta ti)$ generated by the mixer MXi is expressed by Formula (10). In these formulas, k represents any integer not less than 2, and can be, for example, 2 or 3. Even with such a configuration, the amount of time delay in the delayed radio frequency signal $V_{RF}(t-\Delta ti)$ is not dependent on frequency.

[Math 9]

$$i\ V_{LOM}(t-\Delta ti) = V_0 \cos(2\pi f_{LO}(t-\Delta ti + \theta_{LO}) \times k) \quad (9)$$

[Math. 10]

$$V_{RF}(t-\Delta ti) = A\frac{V_0 V_1}{2}\cos\left(2\pi(kf_{LO}+f_{IF})\left(t-\Delta ti + \frac{kf_{LO}\theta_{LO}+f_{IF}\theta_{IF}}{kf_{LO}+f_{IF}}\right)\right) \quad (10)$$

Specific Example 1 of Phased Array Antenna

Figure 2:
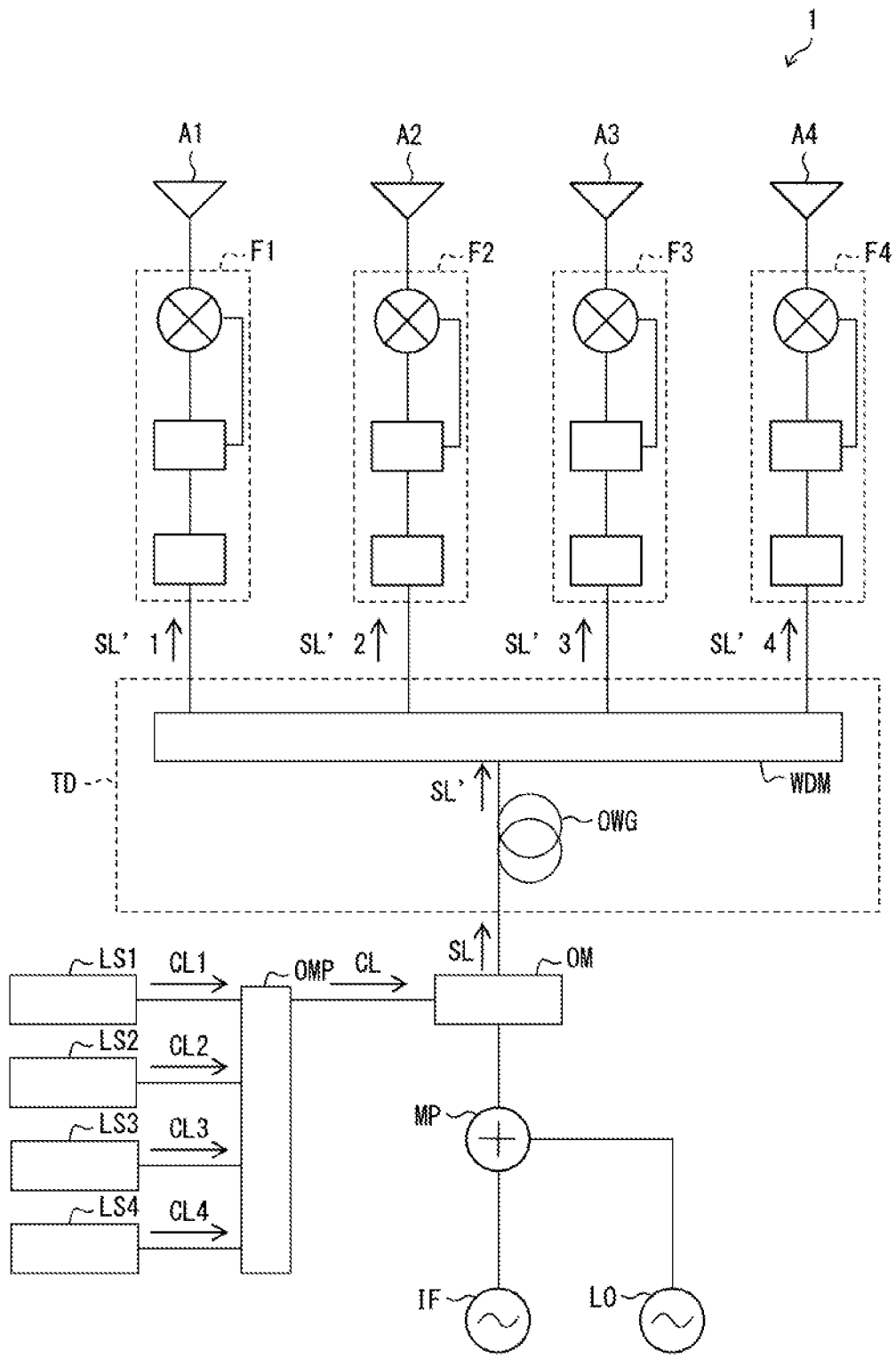
FIG. 2 is a block diagram illustrating Specific Example 1 of the phased array antenna illustrated in FIG. 1.

The following description will discuss, with reference to FIG. 2, Specific Example 1 of the phased array antenna 1. FIG. 2 is a block diagram illustrating a configuration of the phased array antenna 1 in accordance with Specific Example 1.

The phased array antenna 1 in accordance with Specific Example 1 includes, as components for generating the carrier light beam CL, (i) a light source group constituted by n light sources LS1, LS2, . . . and LSn, and (ii) an optical multiplexer OMP.

Each light source LSi (i=1, 2, . . . n) generates a carrier light beam CLi. Carrier light beams CL1, CL2, . . . and Cn generated by respective ones of the light sources LS1 through LSn have respective wavelengths λ1, λ2, . . . and λn which differ from each other. The carrier light beam CLi generated by each light source LSi is supplied to the optical multiplexer OMP. Note that in Specific Example 1, a semiconductor laser element is used as each light source LSi.

The optical multiplexer OMP generates the carrier light beam CL by multiplexing the carrier light beams CL1, CL2, . . . and CLn. The carrier light beam CL includes, as its components, the carrier light beams CL1, CL2, . . . and CLn which have wavelengths λ1, λ2, . . . and λn, respectively. The carrier light beam CL generated by the optical multiplexer OMP is supplied to the optical modulator OM.

The time delay device TD of the phased array antenna 1 in accordance with Specific Example 1 includes an optical waveguide OWG and a wavelength demultiplexer WDM.

The optical waveguide OWG is constituted by a chromatic dispersion medium. The optical waveguide OWG generates a delayed signal light beam SL' by causing chromatic dispersion (time delay dependent on wavelength λ) ΔD(λ) of the signal light beam SL. The signal light beam SL includes, as its components, the signal light beams SL1, SL2, . . . and SLn which have differing wavelengths. The delayed signal light beam SL' includes, as its components, delayed signal light beams SL'1, SL'2, . . . and SL'n which have differing wavelengths and differing phases. The chromatic dispersion ΔD(λ) caused to the signal light beam SL is set to be an adequate amount so that the signal light beams SL'1, SL'2, . . . and SL'n are imparted with the time delays Δt1, Δt2, . . . and Δtn in accordance with the direction of the main beam of radiated electromagnetic waves. The delayed signal light beam SL' generated by the optical waveguide OWG is supplied to the wavelength demultiplexer WDM. Note that in Specific Example 1, a single-mode fiber is used as the optical waveguide OWG.

The wavelength demultiplexer WDM generates (extracts) the delayed signal light beams SL'1, SL'2, . . . and SL'n by carrying out wavelength demultiplexing on the delayed signal light beam SL'. Each delayed signal light beam SL'i generated by the wavelength demultiplexer WDM is supplied to a corresponding feeding circuit Fi.

Note that any of the following configurations may be employed to achieve beam scanning in the phased array antenna 1 in accordance with Specific Example 1.

<Configuration 1>

In the phased array antenna 1 in accordance with Specific Example 1, the time delay $\Delta t_i$ imparted to the delayed radio frequency signal $V_{RF}(t-\Delta t_i)$ can be changed by changing the wavelength $\lambda_i$ of each corresponding carrier light beam CLi. This is because an optical waveguide constituted by a chromatic dispersion medium is used as the optical waveguide OWG.

As such, it is possible to achieve beam scanning by employing a configuration in which (i) each light source LSi allows for variation of the wavelength $\lambda_i$ of the carrier light beam CLi generated, and (ii) the wavelength $\lambda_i$ of the carrier light beam CLi generated by each light source LSi is controlled in accordance with a desired main beam direction.

<Configuration 2>

Alternatively, in the phased array antenna 1 in accordance with Specific Example 1, the time delay $\Delta t_i$ imparted to each delayed radio frequency signal $V_{RF}(t-\Delta t_i)$ can be changed by changing the chromatic dispersion $\Delta D(\lambda)$ caused to the signal light beam SL.

As such, it is possible to achieve beam scanning by employing a configuration in which (i) the optical waveguide OWG allows for variation of the chromatic dispersion $\Delta D(\lambda)$ caused to the signal light beam SL, and (ii) the chromatic dispersion $\Delta D(\lambda)$ that the optical waveguide OWG causes to the signal light beam SL is controlled in accordance with a desired main beam direction.

In order to achieve the phased array antenna 1 in which beam scanning in the 60 GHz band is possible, the phased array antenna 1 can be configured such that, for example, (i) the antenna elements A1, A2, . . . and An are arranged at intervals of 2.4 mm along the same straight line, (ii) the frequency fIF of the intermediate frequency signal $V_{IF}(t)$ is set to be not less than 22 GHz and not more than 31 GHz, and (iii) the frequency fLO of the local signal $V_{LO}(t)$ is set to be 35 GHz. In order to achieve a phased array antenna in which beam scanning in the 70 GHz band is possible, the phased array antenna 1 can be configured such that, for example, (i) the antenna elements A1, A2, . . . and An are arranged at intervals of 2.1 mm along the same straight line, (ii) the frequency fIF of the intermediate frequency signal $V_{IF}(t)$ is set to be not less than 31 GHz and not more than 36 GHz, and (iii) the frequency fLO of the local signal $V_{LO}(t)$ is set to be 40 GHz. This is because, in a case where the frequency of the data signal is less than or equal to 40 GHz, it is possible to employ, as the optical modulator OM, an MZ modulator which is widely commercially available at the time of the filing of the present application.

Specific Example 2 of Phased Array Antenna

Figure 3:
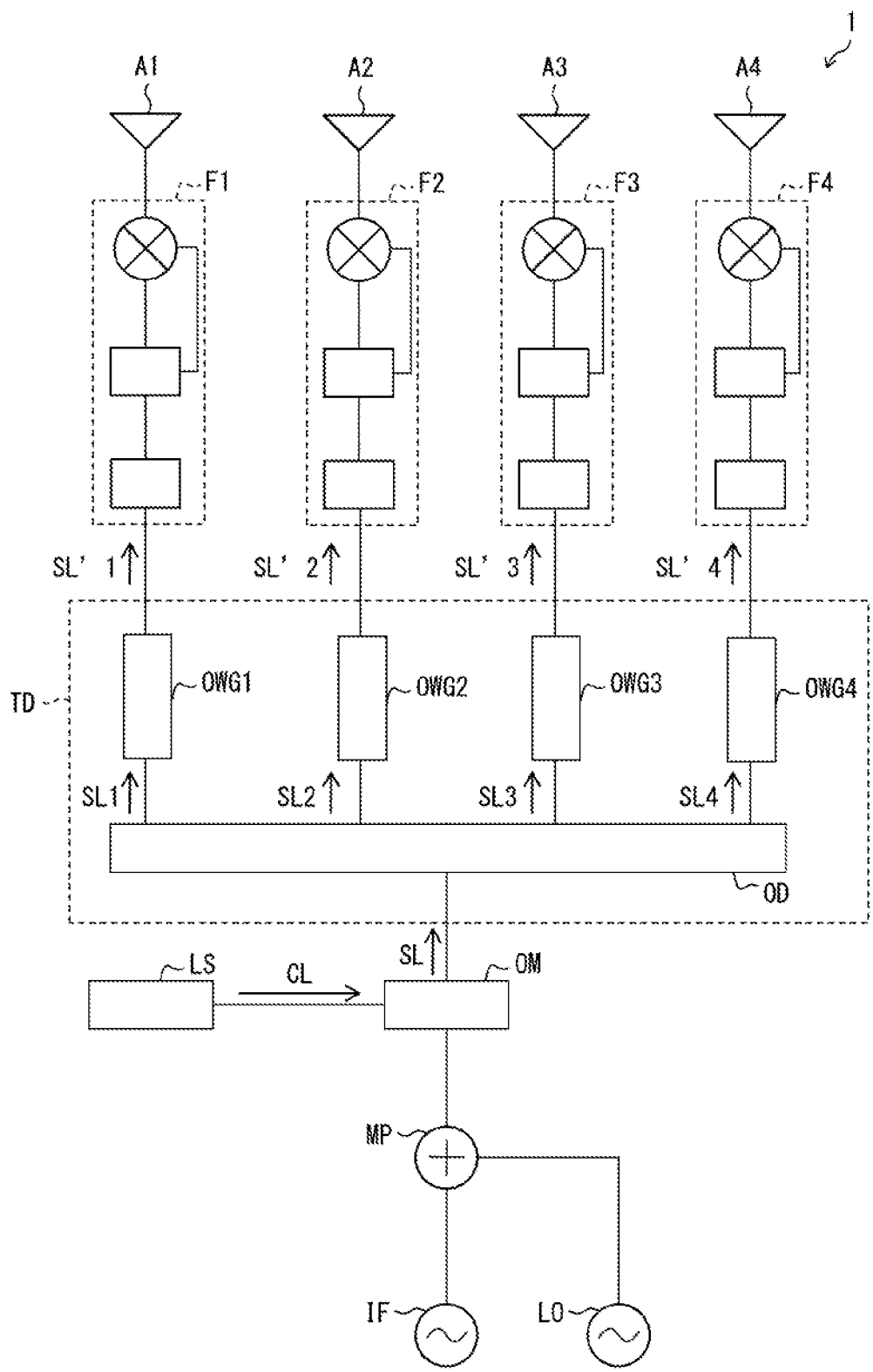
FIG. 3 is a block diagram illustrating Specific Example 2 of the phased array antenna illustrated in FIG. 1.

The following description will discuss, with reference to FIG. 3, Specific Example 2 of the phased array antenna 1. FIG. 3 is a block diagram illustrating a configuration of the phased array antenna 1 in accordance with Specific Example 2.

The phased array antenna 1 in accordance with Specific Example 2 includes, as a component for generating the carrier light beam CL, a single light source LS.

The light source LS generates the carrier light beam CL. The carrier light beam CL generated by the light source LS is supplied to the optical modulator OM. Note that in Specific Example 2, a semiconductor laser element is used as the light source LS.

The time delay device TD of the phased array antenna 1 in accordance with Specific Example 2 includes an optical splitter OD and an optical waveguide group constituted by n optical waveguides OWGi. The optical waveguides OWG1, OWG2, . . . and OWGn are optical waveguides which cause differing chromatic dispersion or optical waveguides having variable optical path lengths. Possible examples of optical waveguides which cause differing chromatic dispersion include (i) a combination of single-mode fibers and dispersion compensating fibers and (ii) dispersion-shifted fibers.

The optical splitter OD generates the signal light beams SL1, SL2, . . . and SLn by splitting the signal light beam SL. Each signal light beam SLi generated by the optical splitter OD is supplied to a corresponding optical waveguide OWGi.

Each optical waveguide OWGi generates a delayed signal light beam SL'i by imparting a time delay $\Delta t_i$ to a corresponding signal light beam SLi. The lengths of the time delays $\Delta t_1$, $\Delta t_2$, . . . and $\Delta t_n$ imparted by the optical waveguides OWG1, OWG2, . . . and OWGn are set in accordance with the direction of the main beam of radiated electromagnetic waves. The delayed signal light beam SL'i generated by each optical waveguide OWGi is supplied to a corresponding feeding circuit Fi. Note that in Specific Example 2, an optical fiber having an optical path length in accordance with the time delay $\Delta t_i$ is used as each optical waveguide OWGi.

Note that any of the following configurations may be employed to achieve beam scanning in the phased array antenna 1 in accordance with Specific Example 2.

<Configuration 1>

In a case where the optical waveguides OWG1, OWG2, . . . and OWGn are optical waveguides which cause differing chromatic dispersion (i.e., optical waveguides constituted by respective chromatic dispersion mediums having differing chromatic dispersion values), the time delay $\Delta t_i$ imparted to each delayed radio frequency signal $V_{RF}(t-\Delta t_i)$ can be changed by changing the wavelength $\lambda$ of the carrier light beam CL.

In such a case, it is therefore possible to achieve beam scanning by employing a configuration in which (i) the light source LS allows for variation of the wavelength $\lambda$ of the carrier light beam CL generated, and (ii) the wavelength $\lambda$ of the carrier light beam CL generated by the light source LS is controlled in accordance with a desired main beam direction.

<Configuration 2>

In a case where the optical waveguides OWG1, OWG2, . . . and OWGn are optical waveguides having variable optical path lengths, it is possible to change the time delay $\Delta t_i$ imparted to each delayed radio frequency signal $V_{RF}(t-\Delta t_i)$ by changing the optical path length of a corresponding optical waveguide OWGi.

In such a case, it is therefore possible to achieve beam scanning by employing a configuration in which (i) each optical waveguide OWGi has a variable optical path length, and (ii) the optical path length of each optical waveguide OWGi is controlled in accordance with a desired main beam direction.

(Variation of Phased Array Antenna)

Figure 4:
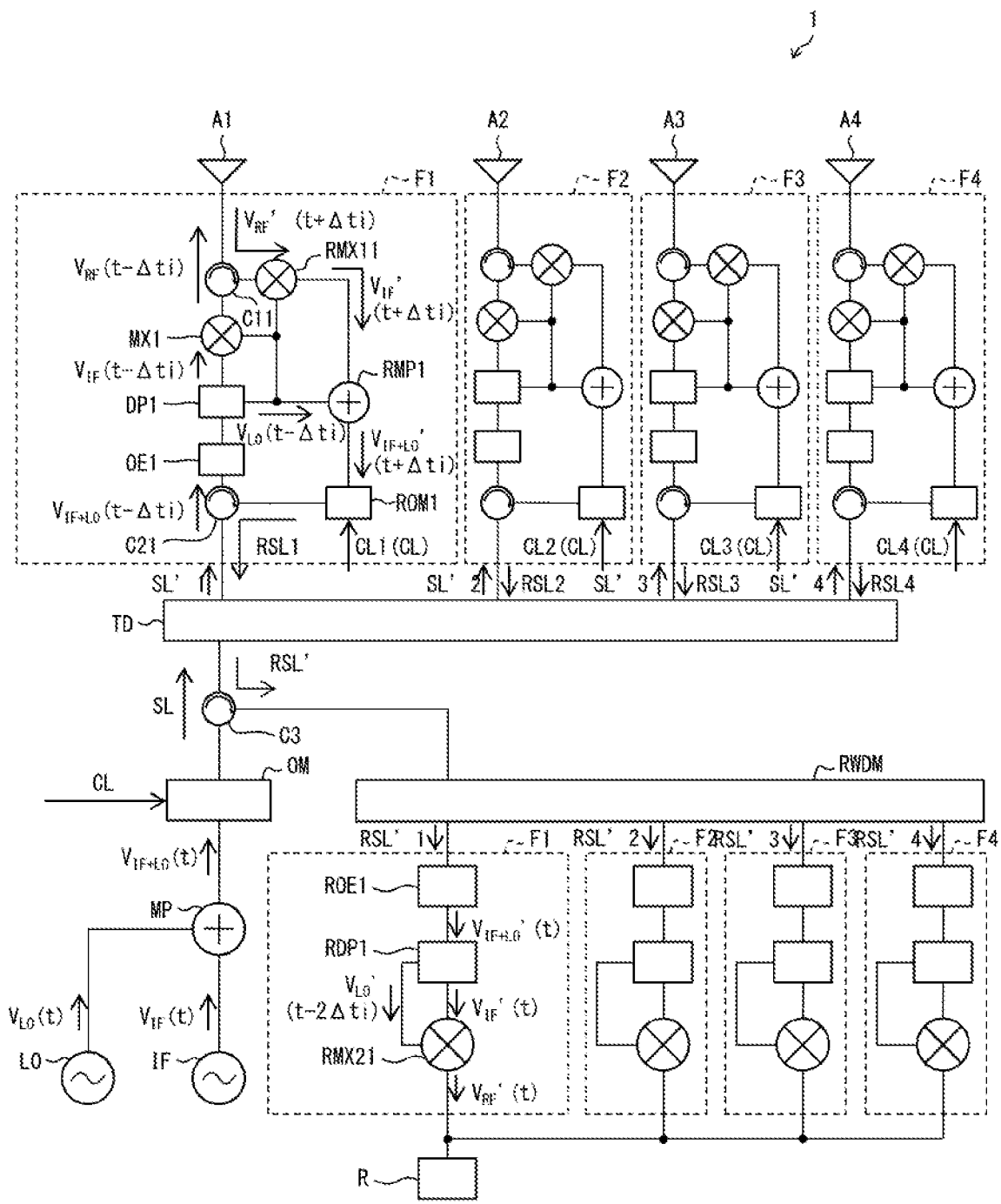
FIG. 4 is a block diagram illustrating a variation of the phased array antenna illustrated in FIG. 1.

The following description will discuss, with reference to FIG. 4, a variation of the phased array antenna 1. FIG. 4 is a block diagram illustrating a configuration of the phased array antenna 1 in accordance with the present variation.

The phased array antenna 1 in accordance with the present variation is a transmitting and receiving antenna which is obtained by adding components for reception to the phased array antenna 1 illustrated in the FIG. 1.

As illustrated in FIG. 4, each feeding circuit Fi of the phased array antenna 1 in accordance with the present variation includes, as components for reception, a mixer RMX1i, a multiplexer RMPi, an optical modulator ROMi, an O/E converter ROEi, a demultiplexer RDPi, and a mixer RMX2i. Each feeding circuit Fi also includes a circulator C1i and a circulator C2i, which are components for enabling both transmitting and receiving. The phased array antenna 1 also includes a circulator C3 and a wavelength demultiplexer RWDM, which are components for enabling both transmitting and receiving.

The mixer RMX1i generates an intermediate frequency signal $V_{IF}'(t+\Delta ti)$ by multiplying a radio frequency signal $V_{RF}'(t+\Delta ti)$ by the delayed local signal $V_{LO}(t-\Delta ti)$. Here, the radio frequency signal $V_{RF}'(t+\Delta ti)$ is a radio frequency signal which has been received by use of a corresponding antenna element Ai. Since the radio frequency signal $V_{RF}'(t)$ is expressed as shown in Formula (11), and the delayed local signal $V_{LO}(t-\Delta ti)$ is expressed as shown in Formula (6), the intermediate frequency signal $V_{IF}'(t+\Delta ti)$ is expressed as shown in Formula (12).

[Math. 11]

$$V'_{RF}(t) = A \frac{V_0 V_1}{2} \cos(2\pi(f_{LO} + f_{IF})(t - \Delta ti)) \tag{11}$$

[Math. 12]

$$V'_{IF}(t + \Delta ti) = A_1 \frac{V_0 V_1}{2} \cos(2\pi f_{IF}(t + \Delta ti) + 2\pi f_{LO}(2\Delta ti - \theta_{LO})) \tag{12}$$

The multiplexer RMPi generates a sum signal $V_{IF+LO}'(t+\Delta ti)$ by adding the intermediate frequency signal $V_{IF}'(t+\Delta ti)$ and the delayed local signal $V_{LO}(t-\Delta ti)$. Since the intermediate frequency signal $V_{IF}'(t+\Delta ti)$ is expressed as shown in Formula (12), and the delayed local signal $V_{LO}(t-\Delta ti)$ is expressed as shown in Formula (6), the sum signal $V_{IF+LO}'(t+\Delta ti)$ is expressed as shown in Formula (13).

[Math. 13]

$$V'_{IF+LO}(t + \Delta ti) = A_1 \frac{V_0 V_2}{2} \cos(2\pi f_{IF}(t + \Delta ti) + 2\pi f_{LO}(2\Delta ti - \theta_{LO})) + V_0 \cos(2\pi f_{LO}(t - \Delta ti + \theta_{LO})) \tag{13}$$

The optical modulator ROMi generates a signal light beam RSLi by carrying out intensity modulation on the carrier light beam CLi by use of the sum signal $V_{IF+LO}'(t+\Delta ti)$. The signal light beam RSLi generated by the optical modulator ROMi is supplied to the time delay device TD. Note that in a case where the configuration of Specific Example 1 illustrated in FIG. 2 is employed, the carrier light beam CLi supplied to each optical modulator ROMi is the carrier light beam generated by a corresponding light source LSi. In a case where the configuration of Specific Example 2 illustrated in FIG. 3 is employed, the carrier light beam CLi supplied to each optical modulator ROMi is the carrier light beam generated by the single light source LS.

The time delay device TD generates a delayed signal light beam RSL' from signal light beams RSL1, RSL2, . . . and RSLn. In a case where the configuration of Specific Example 1 illustrated in FIG. 2 is employed, the time delay device TD is configured to (1) generate a signal light beam RSL by multiplexing the signal light beams RSL1, RSL2, . . . and RSLn and (2) generate the delayed signal light beam RSL' by causing chromatic dispersion $\Delta D(\lambda)$ of the signal light beam RSL. In a case where the configuration of Specific Example 2 illustrated in FIG. 3 is employed, the time delay device TD is configured to (1) generate delayed signal light beams RSL'1, RSL'2, . . . and RSL'n by imparting the time delays $\Delta t1$, $\Delta t2$, . . . and $\Delta tn$ to the signal light beams RSL1, RSL2, . . . and RSLn, respectively, and (2) generate the delayed signal light beam RSL' by multiplexing the delayed signal light beams RSL'1, RSL'2, . . . and RSL'n. The delayed signal light beam RSL' generated by the time delay device TD is supplied to the wavelength demultiplexer RWDM.

The wavelength demultiplexer RWDM generates (extracts) the delayed signal light beams RSL'1, RSL'2, . . . and RSL'n by carrying out wavelength demultiplexing on the delayed signal light beam RLS'. Each delayed signal light beam RSL'i generated by the wavelength demultiplexer RWDM is provided to the O/E converter ROEi of a corresponding feeding circuit Fi.

The O/E converter ROEi generates a delayed sum signal $V_{IF+LO}'(t)$ by carrying out O/E conversion on the delayed signal light beam RSL'i. Since the sum signal $V_{IF+LO}'(t+\Delta ti)$ is expressed as shown in Formula (13), the delayed sum signal $V_{IF+LO}'(t)$ is expressed as shown in Formula (14).

[Math. 14]

$$V'_{IF+LO}(t) = A_1 \frac{V_0 V_1}{2} \cos(2\pi f_{IF} t + 2\pi f_{LO}(2\Delta ti - \theta_{LO})) + V_0 \cos(2\pi f_{LO}(t - 2\Delta ti + \theta_{LO})) \tag{14}$$

The demultiplexer RDPi generates a delayed intermediate frequency signal $V_{IF}'(t)$ and a local signal $V_{LO}'(t-2\Delta ti)$ by demultiplexing the delayed sum signal $V_{IF+LO}'(t)$. Since the delayed sum signal $V_{IF+LO}'(t)$ is expressed as shown in Formula (14), the delayed intermediate frequency signal $V_{IF}'(t)$ and the local signal $V_{LO}'(t-2\Delta ti)$ are expressed as shown in Formulas (15) and (16), respectively.

[Math. 15]

$$V'_{IF}(t) = A_1 \frac{V_0 V_1}{2} \cos(2\pi f_{IF} t + 2\pi f_{LO}(2\Delta ti - \theta_{LO})) \tag{15}$$

[Math. 16]

$$V'_{LO}(t - 2\Delta ti) = V_0 \cos(2\pi f_{LO}(t - 2\Delta ti + \theta_{LO})) \tag{16}$$

The mixer RMX2i generates a delayed radio frequency signal $V_{RF}'(t)$ by multiplying the delayed intermediate frequency signal $V_{IF}'(t)$ by the local signal $V_{LO}'(t-2\Delta ti)$. Since the delayed intermediate frequency signal $V_{IF}'(t)$ and the local signal $V_{LO}'(t-2\Delta ti)$ are expressed as shown in Formulas (15) and (16), respectively, the delayed intermediate frequency signal $V_{IF}'(t)$ is expressed as shown in Formula (17). The delayed radio frequency signal $V_{RF}'(t)$ generated by the mixer RMX2i is supplied to the receiving circuit R after being multiplexed with delayed radio frequency signals $V_{RF}'(t)$ generated by other feeding circuits Fj.

[Math. 17]

$$V_{RF}'(t) = V_0 \cos(2\pi f_{RF} t) \tag{17}$$

The circulator C1i is provided between the mixer MXi and the antenna element Ai and is connected to the mixer RMX1$i$. The circulator C1$i$ supplies, to the antenna element A$i$, the delayed radio frequency signal V$_{RF}$(t−Δti) outputted from the mixer MX$i$ (operation during transmission). The circulator C1$i$ also supplies, to the mixer RMX1$i$, the radio frequency signal V$_{RF}$'(t+Δti) outputted from the antenna element A$i$ (operation during reception).

The circulator C2$i$ is provided between the time delay device TD and the O/E converter OE$i$ and is connected to the optical modulator ROM$i$. The circulator C2$i$ supplies, to the O/E converter OE$i$, the delayed signal light beam SL'$i$ outputted from the time delay device TD (operation during transmission). The circulator C2$i$ also supplies, to the time delay device TD, the signal light beam RSL$i$ generated by the optical modulator ROM$i$ (operation during reception).

The circulator C3 is provided between the optical modulator OM and the time delay device TD and is connected to the wavelength demultiplexer RWDM. The circulator C3 supplies, to the time delay device TD, the signal light beam SL generated by the optical modulator OM (operation during transmission). The circulator C3 also supplies, to the wavelength demultiplexer RWDM, the delayed signal light beam RSL' outputted from the time delay device TD (operation during reception).

Embodiment 21

(Configuration of Phased Array Antenna)

Figure 5:
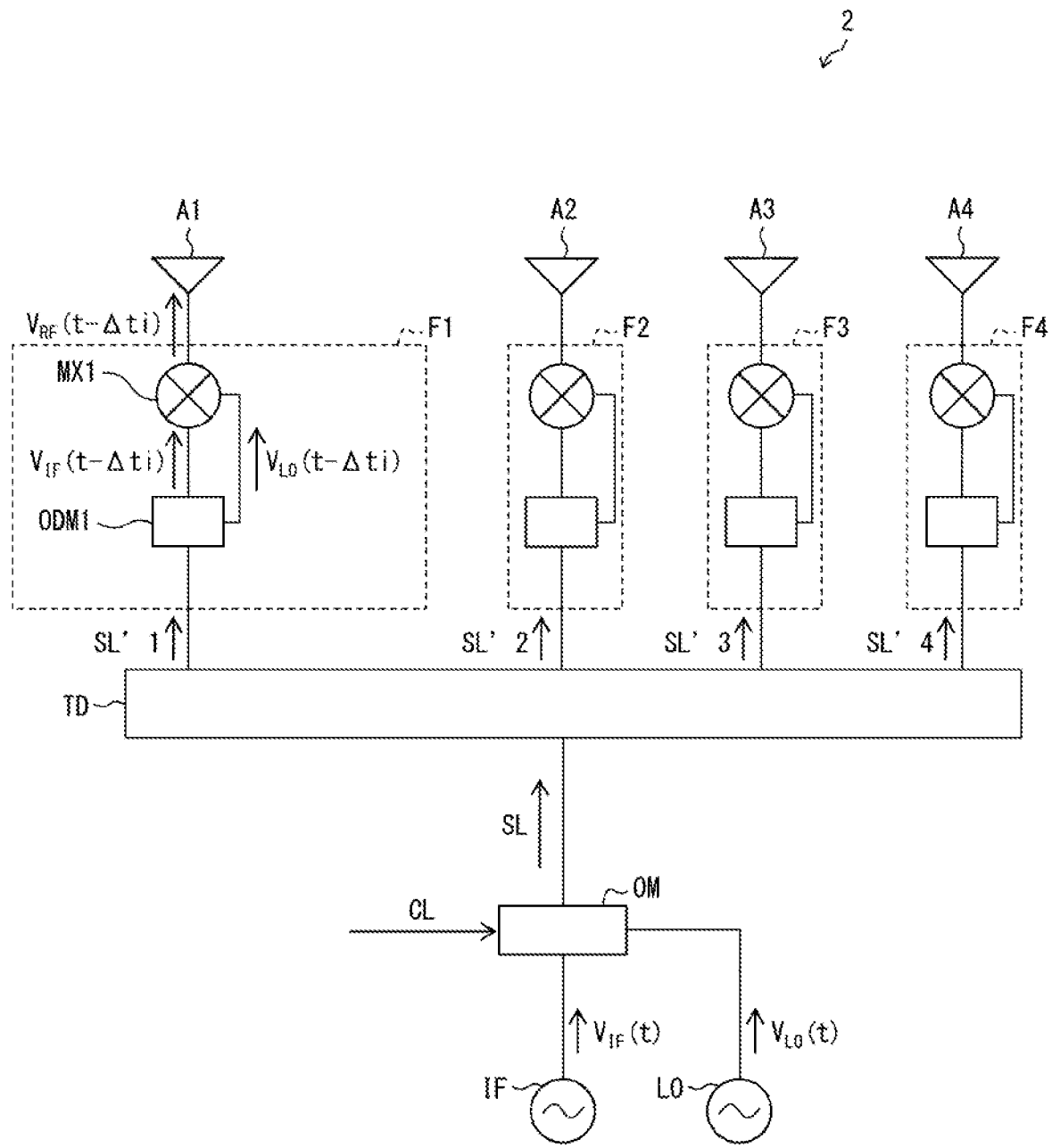
FIG. 5 is a block diagram illustrating a configuration of a phased array antenna in accordance with Embodiment 2 of the present invention.

The following description will discuss, with reference to FIG. 5, a phased array antenna 2 in accordance with Embodiment 2 of the present invention. FIG. 5 is a block diagram illustrating a configuration of the phased array antenna 2.

As illustrated in FIG. 1, the phased array antenna 2 is a transmitting antenna which includes: an optical modulator OM; a time delay device TD; a feeding circuit group constituted by n feeding circuits F1, F2, . . . and F$n$; and an antenna element group constituted by n antenna elements A1, A2, . . . and A$n$. Note here that n represents any integer not less than 2; FIG. 1 illustrates a configuration where n=4.

The optical modulator OM generates a signal light beam SL by carrying out quadrature amplitude modulation on a carrier light beam CL by use of an intermediate frequency signal V$_{IF}$(t) and a local signal V$_{LO}$(t). The intermediate frequency signal V$_{IF}$(t) and the local signal V$_{LO}$(t) are, for example, expressed as shown in Formulas (18) and (19), respectively. The signal light beam SL generated by the optical modulator OM is supplied to the time delay device TD. In Embodiment 2, a dual-parallel Mach-Zehnder (DPMZ) modulator is used as the optical modulator OM. A configuration of a light source which generates the carrier light beam CL will be discussed later with reference to another drawing.

[Math. 18]

$$V_{IF}(t)=V_1 \cos(2\pi f_{RF}(t+\theta_{IF})) \quad (18)$$

[Math. 19]

$$V_{LO}(t)=V_0 \cos(2\pi f_{LO}(t+\theta_{LO})) \quad (19)$$

The time delay device TD generates delayed signal light beams SL'1, SL'2, . . . and SL'$n$ by imparting time delays Δt1, Δt2, . . . and Δt$n$ to the signal light beam SL. In other words, the time delay device TD generates delayed signal light beams from the signal light beam SL, which has the intermediate frequency signal V$_{IF}$(t) and the local signal V$_{LO}$(t) superimposed thereon as an I signal and a Q signal, respectively. Each of the delayed signal light beams is a delayed signal light beam SL'$i$ which has a delayed intermediate frequency signal V$_{IF}$(t−Δti) and a delayed local signal V$_{LO}$(t−Δti) superimposed thereon as an I signal and a Q signal, respectively. Similarly to in Embodiment 1, the time delay Δti imparted to each delayed signal light beam SL'$i$ is set in accordance with the direction of a main beam of radiated electromagnetic waves. Each delayed signal light beam SL'$i$ generated by the time delay device TD is supplied to a corresponding feeding circuit F$i$. A configuration of the time delay device TD will be discussed later with reference to another drawing.

Each feeding circuit F$i$ (i=1, 2, . . . n) converts the corresponding delayed signal light beam SL'$i$ into a delayed radio frequency signal V$_{RF}$(t−Δti). The delayed radio frequency signal V$_{RF}$(t−Δti) generated by each feeding circuit F$i$ is supplied to a corresponding antenna element A$i$.

As illustrated in FIG. 5, each feeding circuit F$i$ includes an optical demodulator ODM$i$ and a mixer MX$i$. Note that in FIG. 1, reference signs have been provided only for the optical demodulator ODM1, the mixer MX1 of feeding circuit F1 because each feeding circuit F$i$ is configurationally identical.

The optical demodulator ODM$i$ generates the delayed intermediate frequency signal V$_{IF}$(t−Δti) and the delayed local signal V$_{LO}$(t−Δti) by demodulating the corresponding delayed signal light beam SL'$i$. Since the intermediate frequency signal V$_{IF}$(t) and the local signal V$_{LO}$(t) are expressed as shown in Formulas (18) and (19), respectively, the delayed intermediate frequency signal V$_{IF}$(t−Δti) and the delayed local signal V$_{LO}$(t−Δti) are expressed as shown in Formulas (20) and (21), respectively. In Embodiment 2, a coherent receiver is used as the optical demodulator ODM$i$.

[Math. 20]

$$V_{IF}(t-\Delta ti)=V_1 \cos(2\pi f_{IF}(t-\Delta ti+\theta_{IF})) \quad (20)$$

[Math. 21]

$$V_{LO}(t-\Delta ti)=V_0 \cos(2\pi f_{LO}(t-\Delta i+\theta_{LO})) \quad (21)$$

The mixer MX$i$ generates the delayed radio frequency signal V$_{RF}$(t−Δti) by multiplying the delayed intermediate frequency signal V$_{IF}$(t−Δti) by the delayed local signal V$_{LO}$(t−Δti). In a case where the delayed intermediate frequency signal V$_{IF}$(t−Δti) and the delayed local signal V$_{LO}$(t−Δti) are expressed as shown in Formula (20) and Formula (21), the delayed radio frequency signal V$_{RF}$(t−Δti) is expressed as shown in Formula (22).

[Math. 22]

$$V_{RF}(t-\Delta ti) = A\frac{V_0 V_1}{2}\cos\left(2\pi(f_{LO}+f_{IF})\left(t-\Delta ti+\frac{f_{LO}\theta_{LO}+f_{IF}\theta_{IF}}{f_{LO}+f_{IF}}\right)\right) \quad (22)$$

A first noteworthy point of the phased array antenna 2 is that an amount of time delay in the delayed radio frequency signal V$_{RF}$(t−Δti) inputted into each antenna element A$i$ is not dependent on frequency. As such, with the phased array antenna 2, even if the frequency of radiated electromagnetic waves is changed, the electromagnetic waves can be radiated in a constant direction, without a change in the time delays Δt1, Δt2, . . . and Δt$n$ imparted to the signal light beam SL.

A second noteworthy point of the phased array antenna 2 is that the data signals modulated by the optical modulator OM are the intermediate frequency signal V$_{IF}$(t) and the local signal V$_{LO}$(t), each of which has a frequency lower than that of the radio frequency signal. This makes it possible to provide a phased array antenna employing an easily-obtainable and/or low cost optical modulator, even in a case where the phased array antenna 2 operates in the millimeter wave band (radio frequency in a range from 30 GHz to 300 GHz).

Figure 15:
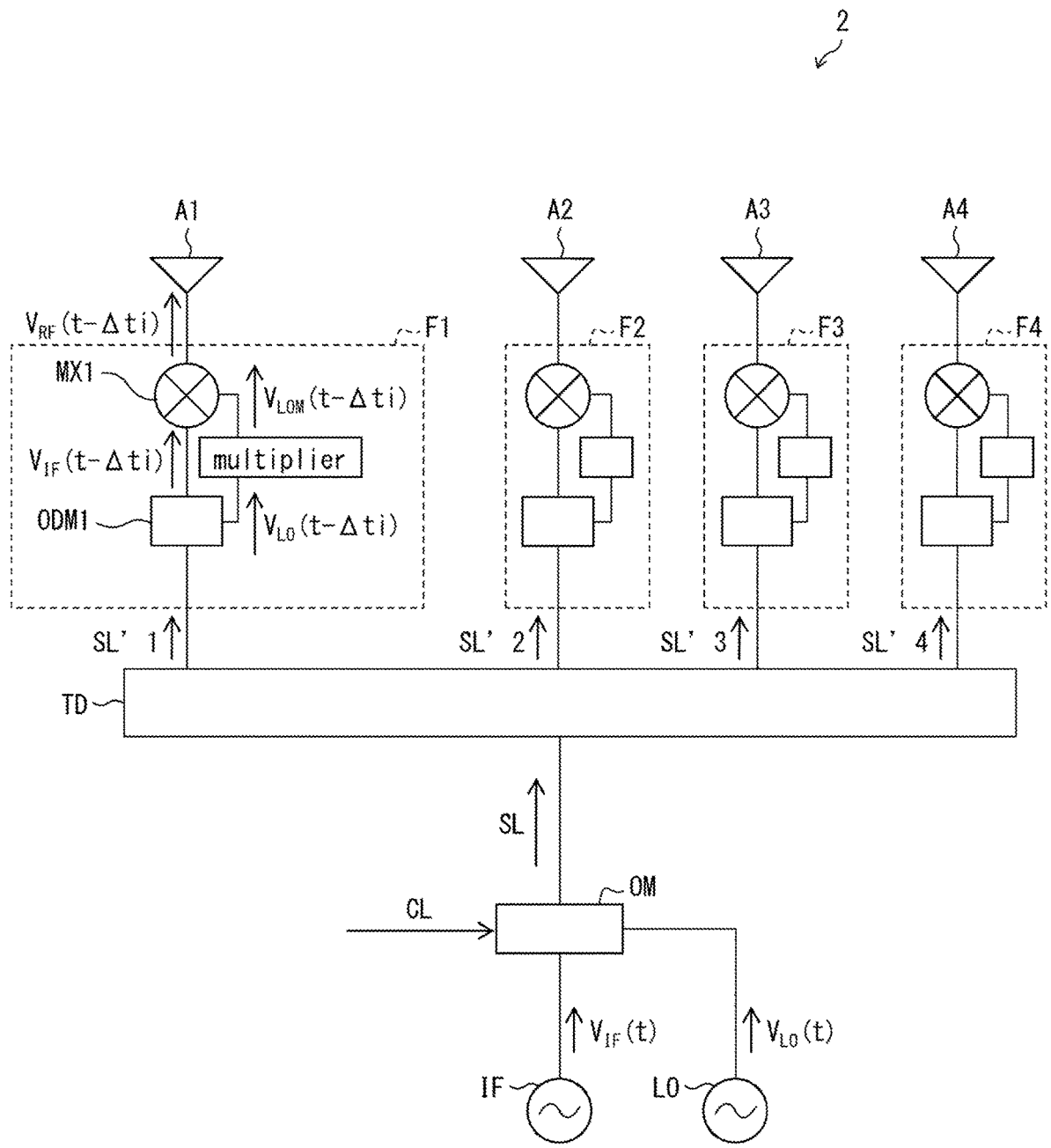
FIG. 15 is a block diagram illustrating a configuration of a phased array antenna in accordance with another aspect of Embodiment 2 of the present invention.

In each feeding circuit Fi, it is also possible to provide, between a demultiplexer DPi and the mixer MXi, a multiplier which multiplies the frequency of the delayed local signal $V_{LO}(t-\Delta ti)$ (for example, as illustrated in FIG. 15). In such a configuration, a delayed local signal $V_{LOM}(t-\Delta ti)$ inputted into the mixer MXi is expressed by Formula (23), and the delayed radio frequency signal $V_{RF}(t-\Delta ti)$ generated by the mixer MXi is expressed by Formula (24). In these formulas, k represents any integer not less than 2, and can be, for example, 2 or 3. Even with such a configuration, the amount of time delay in the delayed radio frequency signal $V_{RF}(t-\Delta ti)$ is not dependent on frequency.

[Math. 23]

$$V_{LOM}(t-\Delta ti)=V_0 \cos(2\pi f_{LO}(t-\Delta ti+\theta_{LO})\times k) \quad (23)$$

[Math. 24]

$$V_{RF}(t-\Delta ti) = A\frac{V_0 V_1}{2}\cos\left(2\pi(kf_{LO}+f_{IF})\left(t-\Delta ti+\frac{kf_{LO}\theta_{LO}+f_{IF}\theta_{IF}}{kf_{LO}+f_{IF}}\right)\right) \quad (24)$$

Specific Example 1 of Phased Array Antenna 2

Figure 6:
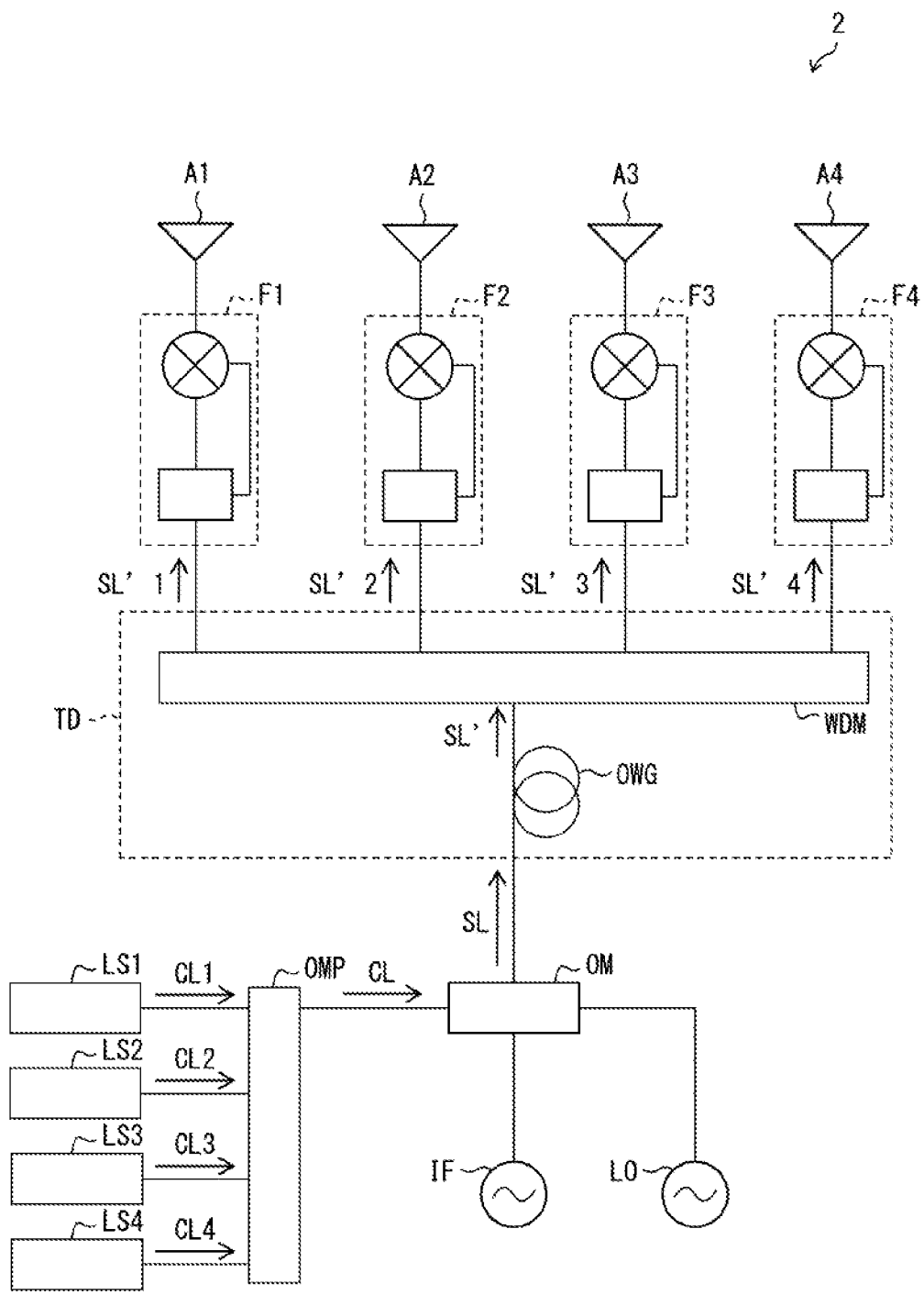
FIG. 6 is a block diagram illustrating Specific Example 1 of the phased array antenna illustrated in FIG. 5.

The following description will discuss, with reference to FIG. 6, Specific Example 1 of the phased array antenna 2. FIG. 6 is a block diagram illustrating a configuration of the phased array antenna 2 in accordance with Specific Example 1.

The phased array antenna 2 in accordance with Specific Example 1 includes, as components for generating the carrier light beam CL, (i) a light source group constituted by n light sources LS1, LS2, . . . and LSn, and (ii) an optical multiplexer OMP.

Each light source LSi (i=1, 2, . . . n) generates a carrier light beam CLi. Carrier light beams CL1, CL2, . . . and Cn generated by respective ones of the light sources LS1 through LSn have respective wavelengths $\lambda 1, \lambda 2, \ldots$ and $\lambda n$ which differ from each other. The carrier light beam CLi generated by each light source LSi is supplied to the optical multiplexer OMP. Note that in Specific Example 1, a semiconductor laser element is used as each light source LSi.

The optical multiplexer OMP generates the carrier light beam CL by multiplexing the carrier light beams CL1, CL2, . . . and CLn. The carrier light beam CL includes, as its components, the carrier light beams CL1, CL2, . . . and CLn which have wavelengths $\lambda 1, \lambda 2, \ldots$ and $\lambda n$, respectively. The carrier light beam CL generated by the optical multiplexer OMP is supplied to the optical modulator OM.

The time delay device TD of the phased array antenna 2 in accordance with Specific Example 1 includes an optical waveguide OWG and a wavelength demultiplexer WDM.

The optical waveguide OWG is constituted by a chromatic dispersion medium. The optical waveguide OWG generates a delayed signal light beam SL' by causing chromatic dispersion (time delay dependent on wavelength $\lambda$) $\Delta D(\lambda)$ of the signal light beam SL. The signal light beam SL includes, as its components, the signal light beams SL1, SL2, . . . and SLn which have differing wavelengths. The delayed signal light beam SL' includes, as its components, delayed signal light beams SL'1, SL'2, . . . and SL'n which have differing wavelengths and differing phases. The chromatic dispersion $\Delta D(\lambda)$ caused to the signal light beam SL is set to be an adequate amount so that the signal light beams SL'1, SL'2, . . . and SL'n are imparted with the time delays $\Delta t1, \Delta t2, \ldots$ and $\Delta tn$ in accordance with the direction of the main beam of radiated electromagnetic waves. The delayed signal light beam SL' generated by the optical waveguide OWG is supplied to the wavelength demultiplexer WDM. Note that in Specific Example 1, a single-mode fiber is used as the optical waveguide OWG.

The wavelength demultiplexer WDM generates (extracts) the delayed signal light beams SL'1, SL'2, . . . and SL'n by carrying out wavelength demultiplexing on the delayed signal light beam SL'. Each delayed signal light beam SL'i generated by the wavelength demultiplexer WDM is supplied to a corresponding feeding circuit Fi.

Note that any of the following configurations may be employed to achieve beam scanning in the phased array antenna 2 in accordance with Specific Example 1.

<Configuration 1>

In the phased array antenna 2 in accordance with Specific Example 1, the time delay $\Delta t$ imparted to the delayed radio frequency signal $V_{RF}(t-\Delta ti)$ can be changed by changing the wavelength $\lambda i$ of each corresponding carrier light beam CLi. This is because an optical waveguide constituted by a chromatic dispersion medium is used as the optical waveguide OWG.

As such, it is possible to achieve beam scanning by employing a configuration in which (i) each light source LSi allows for variation of the wavelength $\lambda i$ of the carrier light beam CLi generated, and (ii) the wavelength $\lambda i$ of the carrier light beam CLi generated by each light source LSi is controlled in accordance with a desired main beam direction.

<Configuration 2>

Alternatively, in the phased array antenna 2 in accordance with Specific Example 1, the time delay $\Delta ti$ imparted to each delayed radio frequency signal $V_{RF}(t-\Delta ti)$ can be changed by changing the chromatic dispersion $\Delta D(\lambda)$ caused to the signal light beam SL.

As such, it is possible to achieve beam scanning by employing a configuration in which (i) the optical waveguide OWG allows for variation of the chromatic dispersion $\Delta D(\lambda)$ caused to the signal light beam SL, and (ii) the chromatic dispersion $\Delta D(\lambda)$ that the optical waveguide OWG causes to the signal light beam SL is controlled in accordance with a desired main beam direction.

Specific Example 2 of Phased Array Antenna 2

Figure 7:
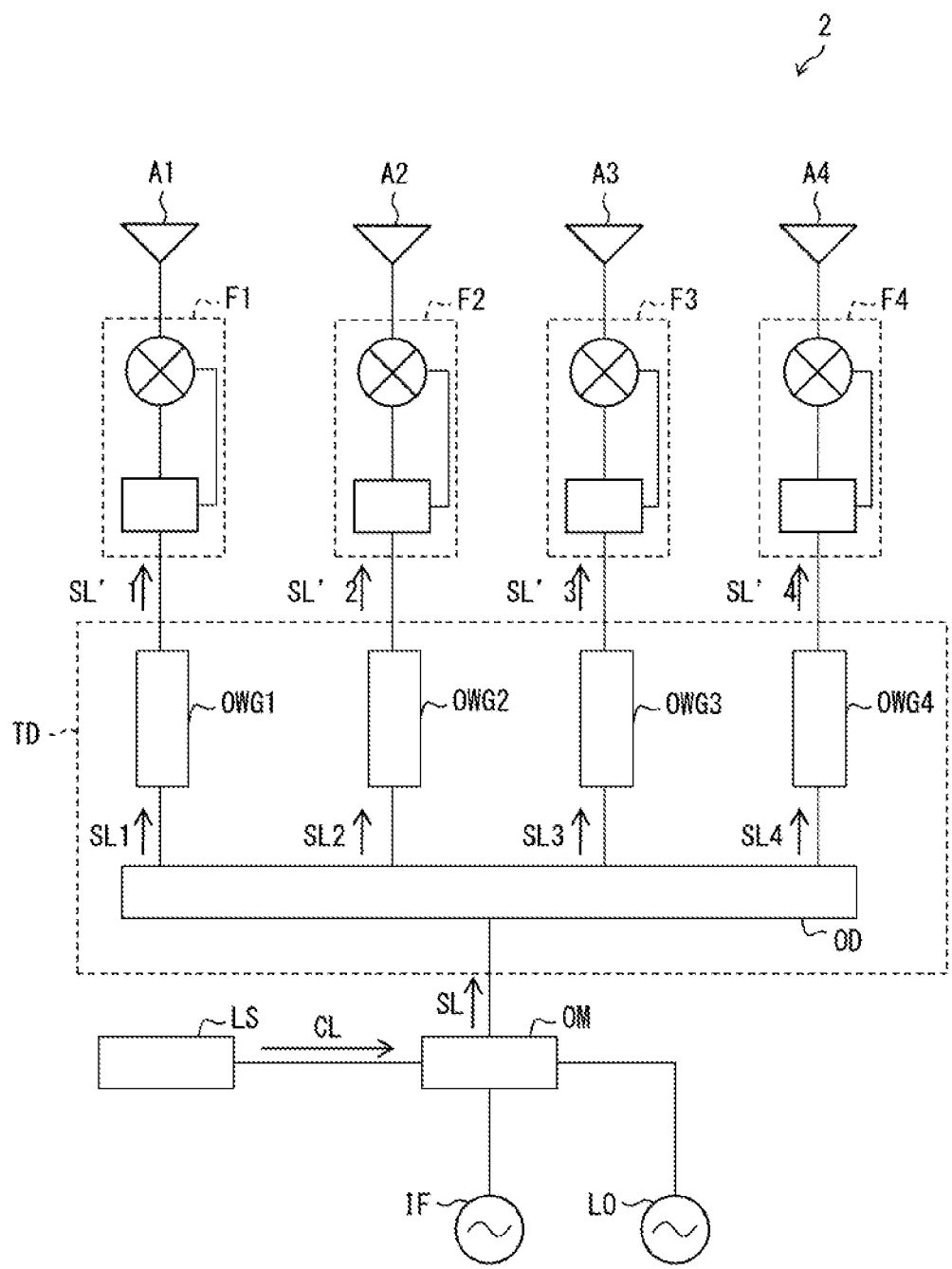
FIG. 7 is a block diagram illustrating Specific Example 2 of the phased array antenna illustrated in FIG. 5.

The following description will discuss, with reference to FIG. 7, Specific Example 2 of the phased array antenna 2. FIG. 7 is a block diagram illustrating a configuration of the phased array antenna 2 in accordance with Specific Example 2.

The phased array antenna 2 in accordance with Specific Example 2 includes, as a component for generating the carrier light beam CL, a single light source LS.

The light source LS generates the carrier light beam CL. The carrier light beam CL generated by the light source LS is supplied to the optical modulator OM. Note that in Specific Example 2, a semiconductor laser element is used as the light source LS.

The time delay device TD of the phased array antenna 2 in accordance with Specific Example 2 includes an optical splitter OD and an optical waveguide group constituted by n optical waveguides OWGi. The optical waveguides OWG1, OWG2, . . . and OWGn are optical waveguides which cause differing chromatic dispersion or optical waveguides having variable optical path lengths. Possible examples of optical waveguides which cause differing chromatic dispersion include (i) a combination of single-mode fibers and dispersion compensating fibers and (ii) dispersion-shifted fibers.

The optical splitter OD generates the signal light beams SL1, SL2, . . . and SLn by splitting the signal light beam SL. Each signal light beam SLi generated by the optical splitter OD is supplied to a corresponding optical waveguide OWGi.

Each optical waveguide OWGi generates a delayed signal light beam SL'i by imparting a time delay Δti to a corresponding signal light beam SLi. The lengths of the time delays Δt1, Δt2, . . . and Δtn imparted by the optical waveguides OWG1, OWG2, . . . and OWGn are set in accordance with the direction of the main beam of radiated electromagnetic waves. The delayed signal light beam SL'i generated by each optical waveguide OWGi is supplied to a corresponding feeding circuit Fi. Note that in Specific Example 2, an optical fiber having an optical path length in accordance with the time delay Δti is used as each optical waveguide OWGi.

Note that any of the following configurations may be employed to achieve beam scanning in the phased array antenna 2 in accordance with Specific Example 2.

<Configuration 1>

In a case where the optical waveguides OWG1, OWG2, . . . and OWGn are optical waveguides which cause differing chromatic dispersion (i.e., optical waveguides constituted by respective chromatic dispersion mediums having differing chromatic dispersion values), the time delay Δti imparted to each delayed radio frequency signal $V_{RF}(t-\Delta ti)$ can be changed by changing the wavelength λ of the carrier light beam CL.

In such a case, it is therefore possible to achieve beam scanning by employing a configuration in which (i) the light source LS allows for variation of the wavelength λ of the carrier light beam CL generated, and (ii) the wavelength λ of the carrier light beam CL generated by the light source LS is controlled in accordance with a desired main beam direction.

<Configuration 2>

In a case where the optical waveguides OWG1, OWG2, . . . and OWGn are optical waveguides having variable optical path lengths, it is possible to change the time delay Δti imparted to each delayed radio frequency signal $V_{RF}(t-\Delta ti)$ by changing the optical path length of a corresponding optical waveguide OWGi.

In such a case, it is therefore possible to achieve beam scanning by employing a configuration in which (i) each optical waveguide OWGi has a variable optical path length, and (ii) the optical path length of each optical waveguide OWGi is controlled in accordance with a desired main beam direction.

(Variation of Phased Array Antenna 2)

Figure 8:
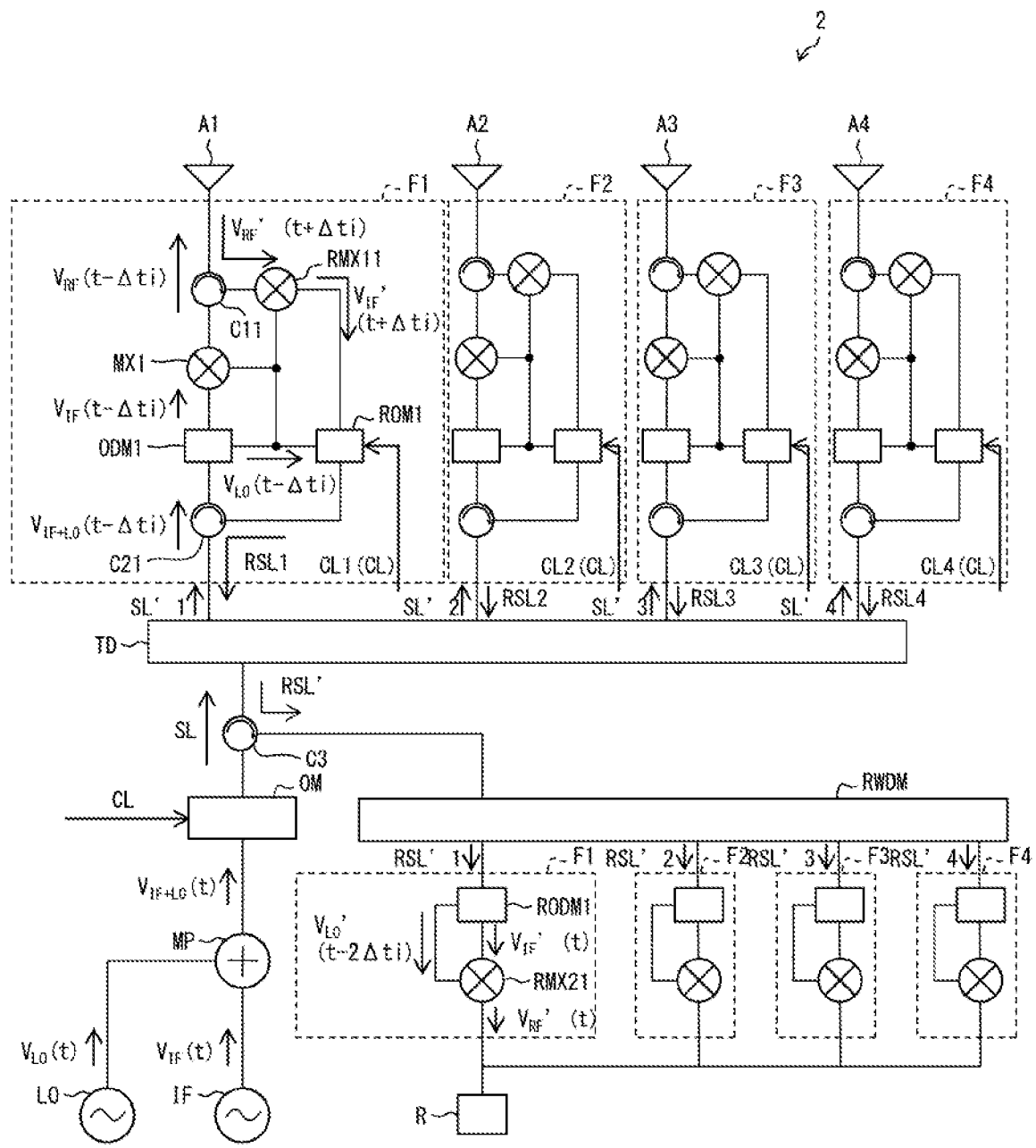
FIG. 8 is a block diagram illustrating a variation of the phased array antenna illustrated in FIG. 5.

The following description will discuss, with reference to FIG. 8, a variation of the phased array antenna 2. FIG. 8 is a block diagram illustrating a configuration of the phased array antenna 2 in accordance with the present variation.

The phased array antenna 2 in accordance with the present variation is a transmitting and receiving antenna which is obtained by adding components for reception to the phased array antenna 2 illustrated in the FIG. 5.

As illustrated in FIG. 8, each feeding circuit Fi of the phased array antenna 2 in accordance with the present variation includes, as components for reception, a mixer RMX1i, an optical modulator ROMi, an optical demodulator ROMDi, and a mixer RMX2i. Each feeding circuit Fi also includes a circulator C1i and a circulator C2i, which are components for enabling both transmitting and receiving. The phased array antenna 2 also includes a circulator C3 and a wavelength demultiplexer RWDM, which are components for enabling both transmitting and receiving.

The mixer RMX1i generates an intermediate frequency signal $V_{IF}'(t+\Delta ti)$ by multiplying a radio frequency signal $V_{RF}'(t+\Delta ti)$ by the delayed local signal $V_{LO}(t-\Delta ti)$. Here, the radio frequency signal $V_{RF}'(t+\Delta ti)$ is a radio frequency signal which has been received by use of a corresponding antenna element Ai. Since the radio frequency signal $V_{RF}'(t+\Delta ti)$ is expressed as shown in Formula (25), and the delayed local signal $V_{LO}(t-\Delta ti)$ is expressed as shown in Formula (21), the intermediate frequency signal $V_{IF}'(t+\Delta ti)$ is expressed as shown in Formula (26).

[Math. 25]
$$V_{RF}'(t+\Delta ti) = A\frac{V_0 V_1}{2}\cos(2\pi(f_{LO}+f_{IF})(t+\Delta ti)) \qquad (25)$$

[Math. 26]
$$V_{IF}'(t+\Delta ti) = A_1\frac{V_0 V_1}{2}\cos(2\pi f_{IF}(t+\Delta ti) + 2\pi \times 2f_{LO}\Delta ti) \qquad (26)$$

The optical modulator ROMi generates a signal light beam RSL by carrying out quadrature amplitude modulation on a corresponding carrier light beam CLi by use of the intermediate frequency signal $V_{IF}'(t+\Delta ti)$ and the delayed local signal $V_{LO}(t-\Delta ti)$. The signal light beam RSLi generated by the optical modulator ROMi is supplied to the time delay device TD. In the present variation, a DPMZ modulator is used as the optical modulator ROMi. In a case where the configuration of Specific Example 1 illustrated in FIG. 6 is employed, the carrier light beam CLi supplied to each optical modulator ROMi is the carrier light beam generated by a corresponding light source LSi. In a case where the configuration of Specific Example 2 illustrated in FIG. 7 is employed, the carrier light beam CLi supplied to each optical modulator ROMi is the carrier light beam generated by the single light source LS.

The time delay device TD generates a delayed signal light beam RSL' from signal light beams RSL1, RSL2, . . . and RSLn. In a case where the configuration of Specific Example 1 illustrated in FIG. 6 is employed, the time delay device TD is configured to (1) generate a signal light beam RSL by multiplexing the signal light beams RSL1, RSL2, . . . and RSLn and (2) generate the delayed signal light beam RSL' by causing chromatic dispersion ΔD(λ) of the signal light beam RSL. In a case where the configuration of Specific Example 2 illustrated in FIG. 7 is employed, the time delay device TD is configured to (1) generate delayed signal light beams RSL'1, RSL'2, . . . and RSL'n by imparting the time delays Δt1, Δt2, . . . and Δtn to the signal light beams RSL1, RSL2, . . . and RSLn, respectively, and (2) generate the delayed signal light beam RSL' by multiplexing the delayed signal light beams RSL'1, RSL'2, . . . and RSL'n. The delayed signal light beam RSL' generated by the time delay device TD is supplied to the wavelength demultiplexer RWDM.

The wavelength demultiplexer RWDM generates (extracts) the delayed signal light beams RSL'1, RSL'2, . . . and RSL'n by carrying out wavelength demultiplexing on the delayed signal light beam RLS'. Each delayed signal light beam RSL'i generated by the wavelength demultiplexer RWDM is provided to the optical demodulator RODMi of a corresponding feeding circuit Fi.

The optical demodulator RODMi generates a delayed intermediate frequency signal $V_{IF}'(t)$ and a local signal $V_{LO}'(t-2\Delta ti)$ by demodulating the delayed signal light beam RSL'i. Since the intermediate frequency signal $V_{IF}'(t+\Delta ti)$ and the delayed local signal $V_{LO}(t-\Delta ti)$ are expressed as shown in Formulas (26) and (21), respectively, the delayed intermediate frequency signal $V_{IF}'(t)$ and the local signal $V_{LO}'(t-2\Delta ti)$ are expressed as shown in Formulas (27) and (28), respectively. Note that in the present variation, a coherent receiver is used as each optical demodulator RODMi.

[Math. 27]

$$V_{IF}'(t) = A\frac{V_0 V_1}{2}\cos(2\pi f_{IF}t + 2 \times 2f_{LO}\Delta ti) \quad (27)$$

[Math. 28]

$$V_{LO}'(t - 2\Delta ti) = V_0\cos(2\pi f_{LO}(t - 2\Delta ti)) \quad (28)$$

The mixer RMX2i generates a delayed radio frequency signal $V_{RF}'(t)$ by multiplying the delayed intermediate frequency signal $V_{IF}'(t)$ by the local signal $V_{LO}'(t-2\Delta ti)$. Since the delayed intermediate frequency signal $V_{IF}'(t)$ and the local signal $V_{LO}'(t-2\Delta ti)$ are expressed as shown in Formulas (27) and (28), respectively, the delayed radio frequency signal $V_{RF}'(t)$ is expressed as shown in Formula (29). The delayed radio frequency signal $V_{RF}'(t)$ generated by the mixer RMX2 is supplied to the receiving circuit R after being multiplexed with delayed radio frequency signals $V_{RF}'(t)$ generated by other feeding circuits Fj.

[Math. 29]

$$V_{RF}'(t) = A_1\frac{V_0^2 V_1}{2}\cos(2\pi f_{RF}t) \quad (29)$$

The circulator C1i is provided between the mixer MXi and the antenna element Ai and is connected to the mixer RMX1i. The circulator C1i supplies, to the antenna element Ai, the delayed radio frequency signal $V_{RF}(t-\Delta ti)$ outputted from the mixer MXi (operation during transmission). The circulator C1i also supplies, to the mixer RMX1i, the radio frequency signal $V_{RF}'(t+\Delta ti)$ outputted from the antenna element Ai (operation during reception).

The circulator C2i is provided between the time delay device TD and the optical demodulator ODMi and is connected to the optical modulator ROMi. The circulator C2i supplies, to the optical demodulator ODMi, the delayed signal light beam SL'i outputted from the time delay device TD (operation during transmission). The circulator C2i also supplies, to the time delay device TD, the signal light beam RSLi generated by the optical modulator ROMi (operation during reception).

The circulator C3 is provided between the optical modulator OM and the time delay device TD and is connected to the wavelength demultiplexer RWDM. The circulator C3 supplies, to the time delay device TD, the signal light beam SL generated by the optical modulator OM (operation during transmission). The circulator C3 also supplies, to the wavelength demultiplexer RWDM, the delayed signal light beam RSL' outputted from the time delay device TD (operation during reception).

Further Variation of Phased Array Antenna in Accordance with Embodiment 1

Figure 9:
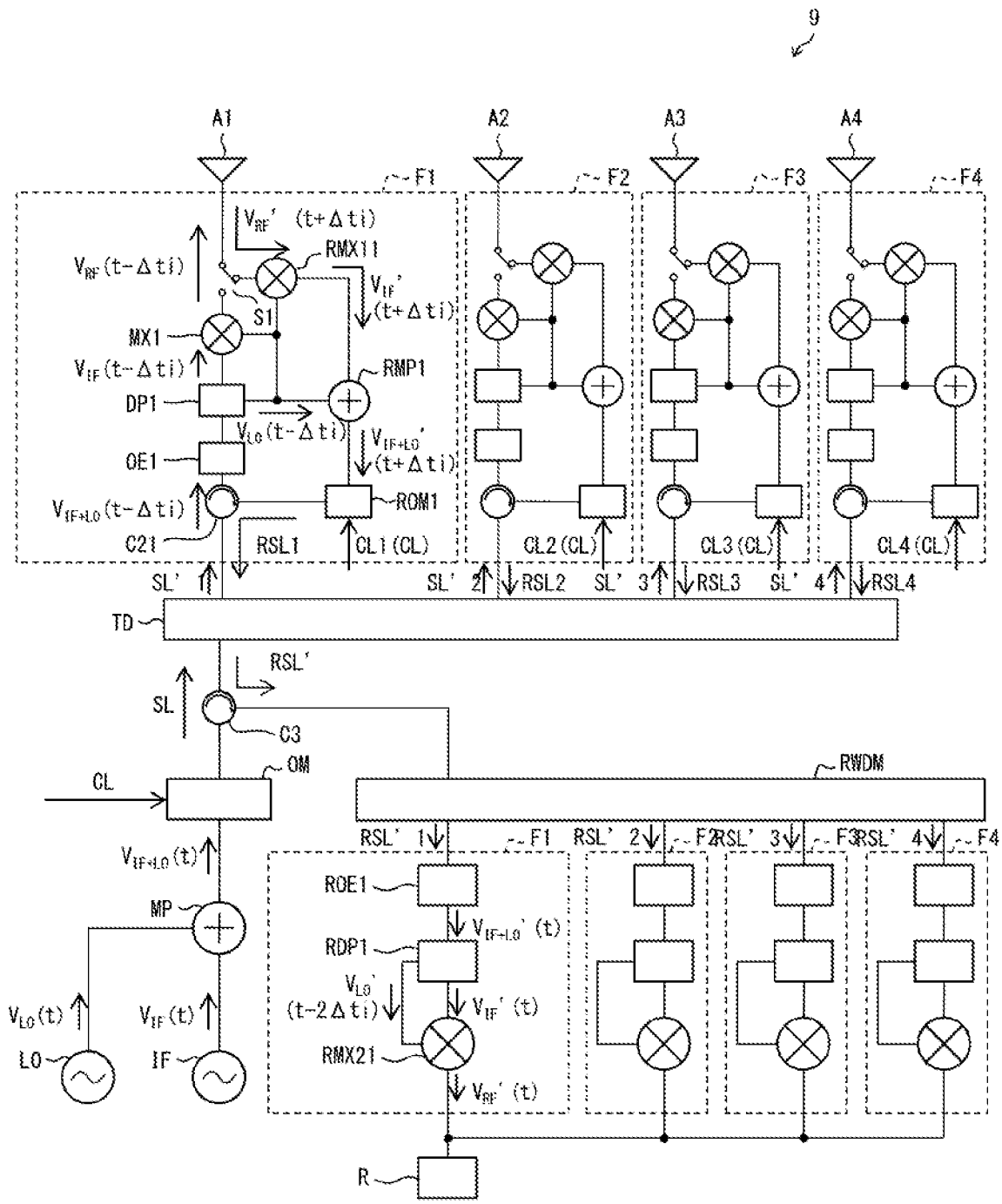
FIG. 9 is a block diagram illustrating another variation of the phased array antenna illustrated in FIG. 1.

The following description will discuss, with reference to FIG. 9, a further variation of the phased array antenna 1 in accordance with Embodiment 1. FIG. 9 is a block diagram illustrating a configuration of a phased array antenna 9 in accordance with the present variation.

The phased array antenna 9 in accordance with the present variation is a transmitting and receiving antenna which is similar to the phased array antenna 1 illustrated in FIG. 4.

As illustrated in FIG. 9, the phased array antenna 9 in accordance with this further variation is obtained by replacing the circulator C1i, of the phased array antenna 1 in accordance with the first variation, with a switch Si.

The switch Si is controlled such that, during transmission, the mixer MXi and the antenna element Ai are connected, and the delayed radio frequency signal $V_{RF}(t-\Delta ti)$ outputted from the mixer MXi is supplied to the antenna element Ai. Furthermore, the switch Si is controlled such that, during reception, the antenna element Ai is connected to the mixer RMX1i, and the radio frequency signal $V_{RF}'(t+\Delta ti)$ outputted from the antenna element Ai is supplied to the mixer RMX1i.

Further Variation of Phased Array Antenna in Accordance with Embodiment 2

Figure 10:
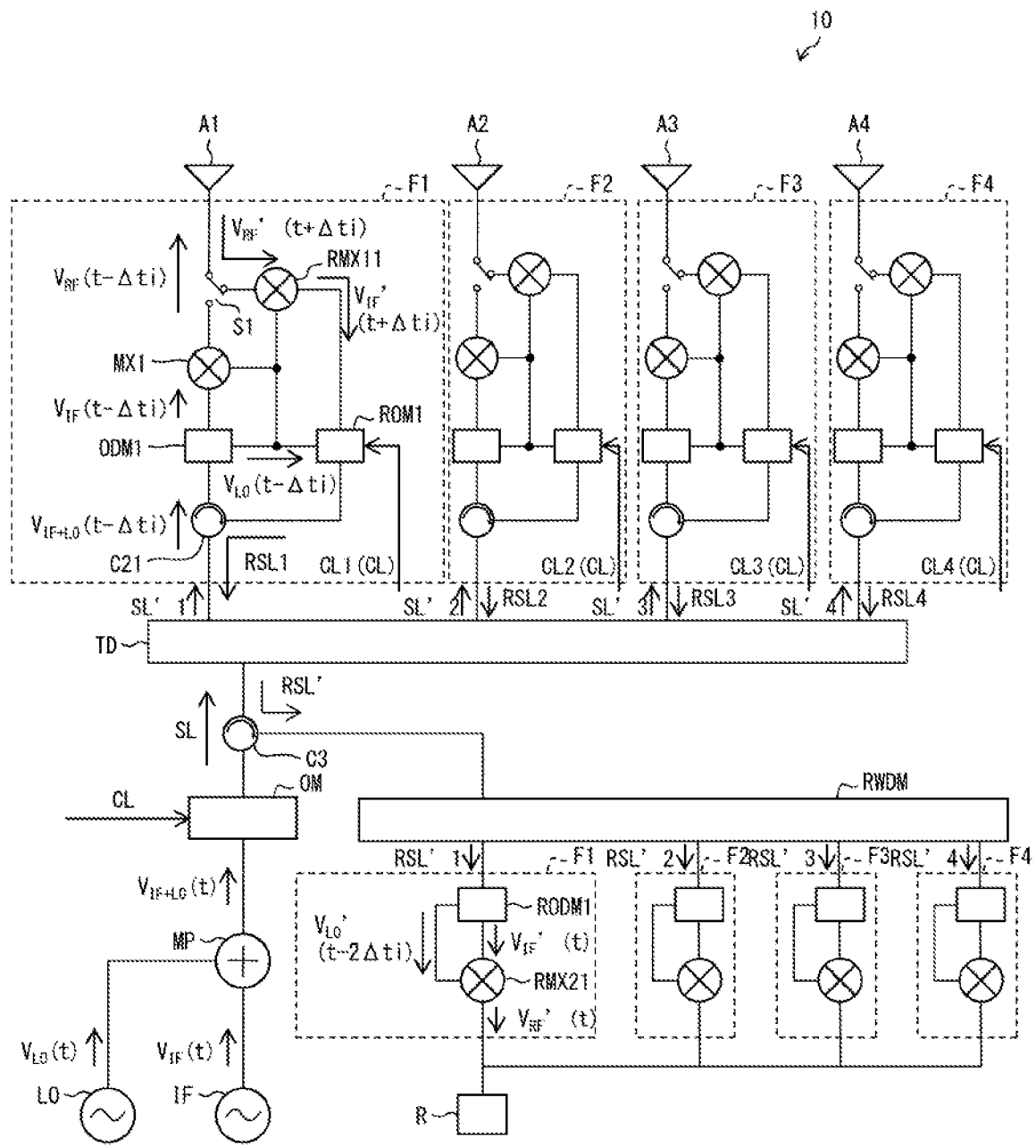
FIG. 10 is a block diagram illustrating another variation of the phased array antenna illustrated in FIG. 5.
Figure 11:
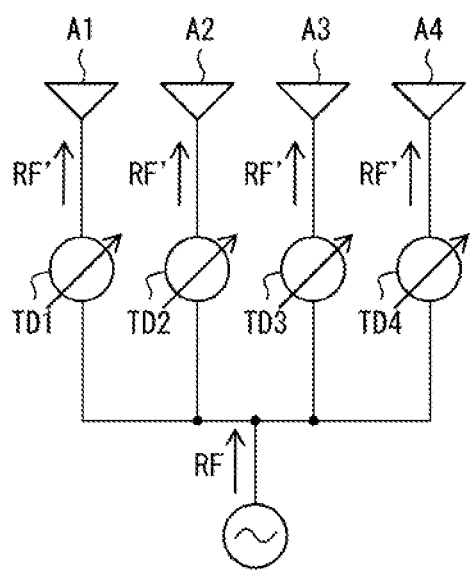
FIG. 11 is a block diagram illustrating a configuration of a conventional phased array antenna.
Figure 12:
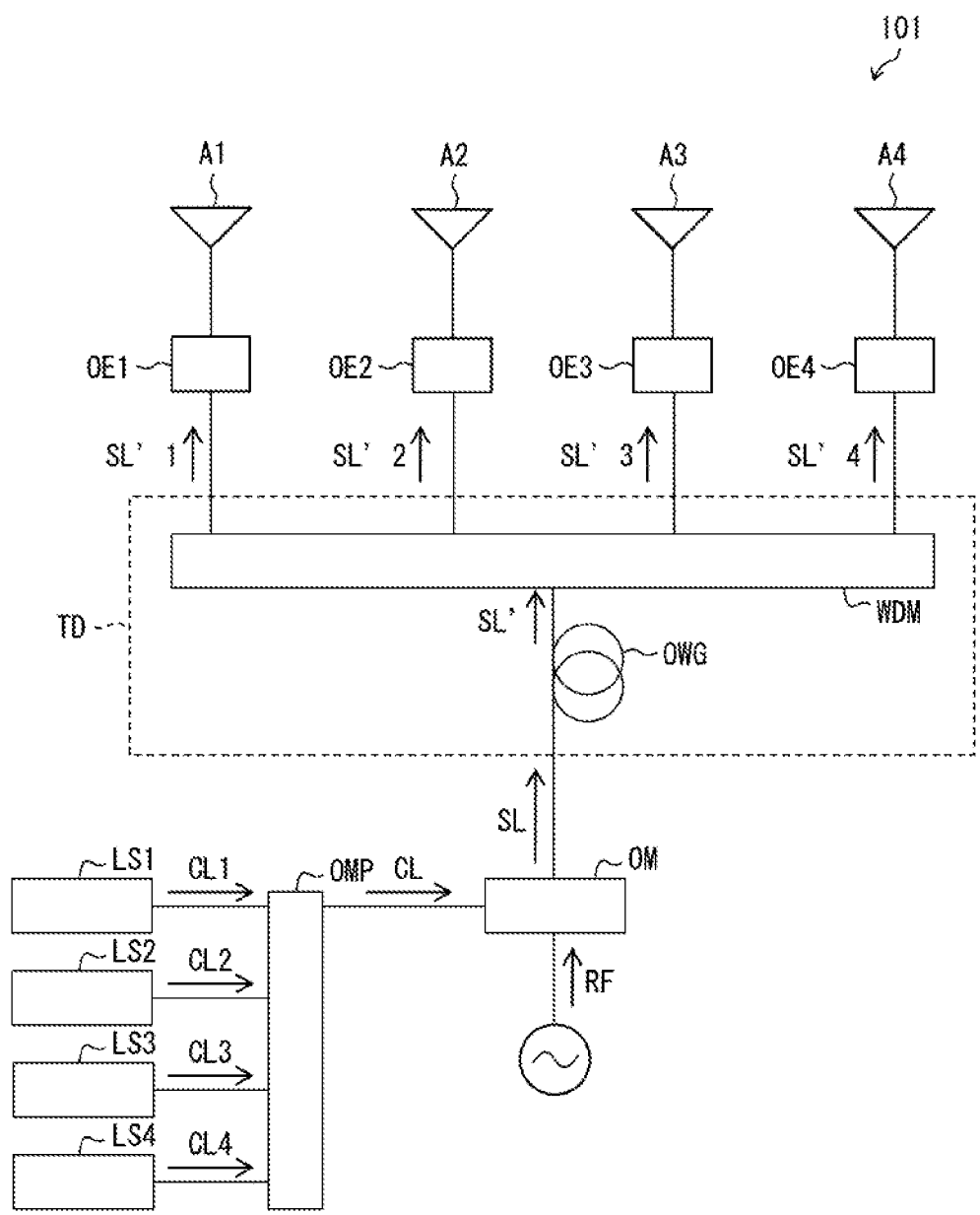
FIG. 12 is a block diagram illustrating a configuration of a conventional phased array antenna.
Figure 13:
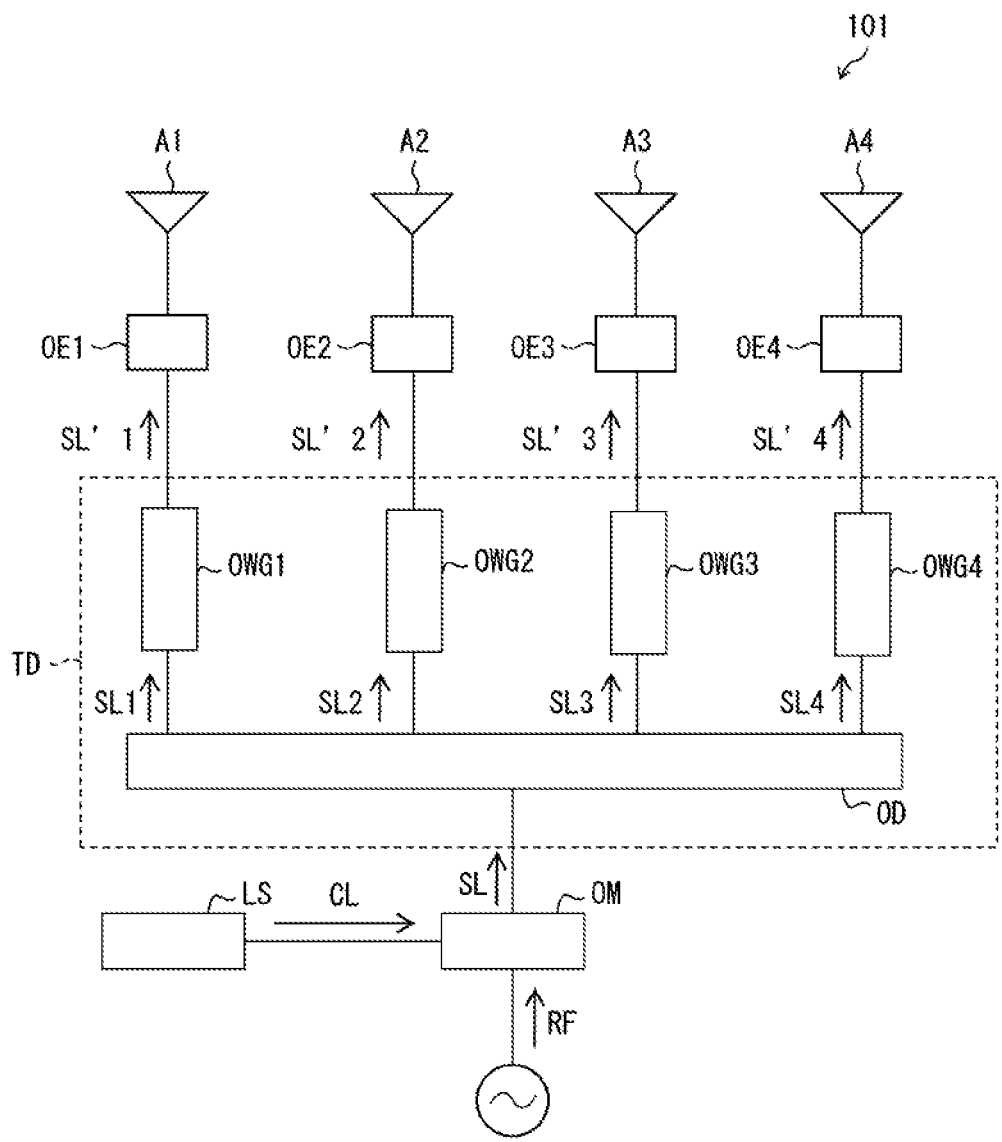
FIG. 13 is a block diagram illustrating a configuration of a conventional phased array antenna.

The following description will discuss, with reference to FIG. 10, a further variation of the phased array antenna 2 in accordance with Embodiment 2. FIG. 10 is a block diagram illustrating a configuration of a phased array antenna 10 in accordance with the present variation.

The phased array antenna 10 in accordance with the present variation is a transmitting and receiving antenna which is similar to the phased array antenna 2 illustrated in FIG. 8.

As illustrated in FIG. 10, the phased array antenna 10 in accordance with this further variation is obtained by replacing the circulator C1i, of the phased array antenna 2 in accordance with the first variation, with a switch Si.

The switch Si is controlled such that, during transmission, the mixer MXi and the antenna element Ai are connected, and the delayed radio frequency signal $V_{RF}(t-\Delta ti)$ outputted from the mixer MXi is supplied to the antenna element Ai. Furthermore, the switch Si is controlled such that, during reception, the antenna element Ai is connected to the mixer RMX1i, and the radio frequency signal $V_{RF}'(t+\Delta t1)$ outputted from the antenna element Ai is supplied to the mixer RMX1i.

Recap

A phased array antenna in accordance with one of the above embodiments includes: n (n is an integer of 2 or more) antenna elements A1, A2, . . . and An; a multiplexer configured to generate a sum signal $V_{IF+LO}(t)$ by adding an intermediate frequency signal $V_{IF}(t)$ and a local signal $V_{LO}(t)$; an optical modulator configured to generate a signal light beam SL by carrying out intensity modulation on a carrier light beam CL by use of the sum signal $V_{IF+LO}(t)$; a time delay device configured to generate delayed signal light beams SL'1, SL'2, ... and SL'n by imparting time delays Δt1, Δt2, ... and Δtn to the signal light beam SL; and a feeding circuit group constituted by feeding circuits, each of which is a feeding circuit Fi configured to convert a corresponding delayed signal light beam SL'i into a delayed radio frequency signal $V_{RF}(t-\Delta ti)$ to be supplied to a corresponding antenna element Ai, each feeding circuit Fi (i×1, 2, ... n) including: an O/E converter configured to generate a delayed sum signal $V_{IF+LO}(t-\Delta ti)$ by carrying out O/E conversion on the corresponding delayed signal light beam SL'i; a demultiplexer configured to generate a delayed intermediate frequency signal $V_{IF}(t-\Delta ti)$ and a delayed local signal $V_{LO}(t-\Delta ti)$ by demultiplexing the delayed sum signal $V_{IF+LO}(t-\Delta ti)$; and a mixer configured to generate the delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$.

With the above configuration, the time delay of the delayed radio frequency signal $V_{RF}(t-\Delta ti)$ supplied to each antenna element Ai is not dependent on frequency. As such, with the above configuration, even if the frequency of radiated electromagnetic waves is changed, the electromagnetic waves can be radiated in a constant direction, without a change in the time delays Δt1, Δt2, ... and Δtn imparted to the signal light beam SL.

Furthermore, with the above configuration, the data signal modulated by the optical modulator is the sum signal $V_{IF+LO}(t)$ obtained by adding the intermediate frequency signal $V_{IF}(t)$ and the local signal $V_{LO}(t)$. This sum signal $V_{IF+LO}(t)$ has a frequency which is lower than that of a radio frequency signal $V_{RF}(t)$. The above configuration therefore makes it possible to provide a phased array antenna employing an easily-obtainable and/or low cost O/E converter and optical modulator, even in a case where the phased array antenna operates in the millimeter wave band (radio frequency in a range from 30 GHz to 300 GHz).

A phased array antenna in accordance with another one of the above embodiments includes: n (n is an integer of 2 or more) antenna elements A1, A2, ... and An; an optical modulator configured to generate a signal light beam SL by carrying out quadrature amplitude modulation on a carrier light beam CL by use of an intermediate frequency signal $V_{IF}(t)$ and a local signal $V_{LO}(t)$; a time delay device configured to generate delayed signal light beams SL'1, SL'2, ... and SL'n by imparting time delays Δt1, Δt2, ... and Δtn to the signal light beam SL; and a feeding circuit group constituted by feeding circuits, each of which is a feeding circuit Fi configured to convert a corresponding delayed signal light beam SL'i into a delayed radio frequency signal $V_{RF}(t-\Delta ti)$ to be supplied to a corresponding antenna element Ai, each feeding circuit Fi (i=1, 2, ... n) including: an optical demodulator configured to generate a delayed intermediate frequency signal $V_{IF}(t-\Delta ti)$ and a delayed local signal $V_{LO}(t-\Delta ti)$ by demodulating the corresponding delayed signal light beam SL'i; and a mixer configured to generate the delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$.

With the above configuration, the time delay of the delayed radio frequency signal $V_{RF}(t-\Delta ti)$ supplied to each antenna element Ai is not dependent on frequency. As such, with the above configuration, even if the frequency of radiated electromagnetic waves is changed, the electromagnetic waves can be radiated in a constant direction, without a change in the time delays Δt1, Δt2, ... and Δtn imparted to the signal light beam SL.

Furthermore, with the above configuration, the data signal modulated by the optical modulator is the sum signal $V_{IF+LO}(t)$ obtained by adding the intermediate frequency signal $V_{IF}(t)$ and the local signal $V_{LO}(t)$. This sum signal $V_{IF+LO}(t)$ has a frequency which is lower than that of a radio frequency signal $V_{RF}(t)$. The above configuration therefore makes it possible to provide a phased array antenna employing an easily-obtainable and/or low cost O/E converter and optical modulator, even in a case where the phased array antenna operates in the millimeter wave band (radio frequency in a range from 30 GHz to 300 GHz).

The phased array antenna in accordance with the above embodiments can be preferably arranged such that the phased array antenna further includes: a light source group constituted by light sources each of which generates a carrier light beam CLi such that each of carrier light beams CL1, CL2, ... and CLn generated by respective ones of the light sources has a differing wavelength; and a multiplexer configured to generate the carrier light beam CL by multiplexing the carrier light beams CL1, CL2, ... and CLn; and such that the time delay device includes: an optical waveguide configured to generate a delayed signal light beam SL' by causing chromatic dispersion of the signal light beam SL; and a wavelength demultiplexer configured to generate the delayed signal light beams SL'1, SL'2, ... and SL'n by carrying out wavelength demultiplexing on the delayed signal light beam SL'.

With the above configuration, only one waveguide is needed for imparting a delay to the signal light beam SL. This makes it possible to provide the phased array antenna at a lower cost.

The phased array antenna in accordance with the above embodiments can be preferably arranged such that each of the light sources is configured to allow for variation of a wavelength of the carrier light beam CLi generated thereby.

With the above configuration, it is possible to achieve beam scanning by controlling the wavelength of the carrier light beam CLi generated by each light source.

The phased array antenna in accordance with the above embodiments can be preferably arranged such that the optical waveguide is configured to allow for variation of the chromatic dispersion caused to the signal light beam SL.

With the above configuration, it is possible to achieve beam scanning by controlling the chromatic dispersion which the optical waveguide causes to the signal light beam.

The phased array antenna in accordance with the above embodiments can be preferably arranged such that the phased array antenna further includes: a light source configured to generate the carrier light beam CL, and such that the time delay device includes: an optical splitter configured to generate signal light beams SL1, SL2, ... and SLn by splitting the signal light beam SL; and an optical waveguide group constituted by optical waveguides, each optical waveguide being configured to generate a delayed signal light beam SL'i by imparting a time delay Δti to a corresponding signal light beam SLi such that each of time delays Δt1, Δt2, ... and Δtn imparted by respective ones of the optical waveguides is of a differing length.

With the above configuration, only one light source is needed for generating the carrier light beam CL. This makes it possible to provide the phased array antenna at a lower cost.

The phased array antenna in accordance with the above embodiments can be preferably arranged such that: the light source which generates the carrier light beam CL is configured to allow for variation of a wavelength of the carrier light beam CL generated thereby; and each of the optical waveguides is configured to cause differing chromatic dispersion.

With the above configuration, it is possible to achieve beam scanning by controlling the wavelength of the carrier light beam CL generated by the light source.

The phased array antenna in accordance with the above embodiments can be preferably arranged such that each of the optical waveguides has a variable optical path length.

With the above configuration, it is possible to achieve beam scanning by controlling the time delay Δti imparted by each optical waveguide to a corresponding signal light beam.

The phased array antenna in accordance with the above embodiments can be preferably arranged such that: instead of including the mixer configured to generate the delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$, each feeding circuit Fi includes: a multiplier configured to generate a delayed local signal $V_{LOM}(t-\Delta ti)$ by multiplying a frequency of the delayed local signal $V_{LO}(t-\Delta ti)$; and a mixer configured to generate the delayed radio frequency signal $V_{RF}(t-\Delta t)$ by multiplying the delayed intermediate frequency signal $V_{IF}(t-\Delta ti)$ by the delayed local signal $V_{LOM}(t-\Delta ti)$.

With the above configuration as well, the time delay of the delayed radio frequency signal $V_{RF}(t-\Delta ti)$ supplied to each antenna element Ai is not dependent on frequency. As such, with the above configuration as well, even if the frequency of radiated electromagnetic waves is changed, the electromagnetic waves can be radiated in a constant direction, without a change in the time delays Δt1, Δt2, . . . and Δtn imparted to the signal light beam SL.

The phased array antenna in accordance with the above embodiments can be preferably arranged such that each feeding circuit Fi further includes: a mixer configured to generate an intermediate frequency signal $V_{IF}'(t+\Delta ti)$ by multiplying (a) a radio frequency signal $V_{RF}'(t+\Delta ti)$ which has been received by use of the corresponding antenna element Ai by (b) the delayed local signal $V_{LO}(t-\Delta ti)$; a multiplexer configured to generate a sum signal $V_{IF+LO}'(t+\Delta ti)$ by adding the intermediate frequency signal $V_{IF}'(t+\Delta ti)$ and the delayed local signal $V_{LO}(t-\Delta ti)$;

an optical modulator configured to generate a signal light beam RSLi by carrying out intensity modulation by use of the sum signal $V_{IF+LO}'(t+\Delta ti)$; an O/E converter configured to generate a delayed sum signal $V_{IF+LO}'(t)$ by carrying out O/E conversion on a delayed signal light beam RSL'i, the delayed signal light beam RSL'i being obtained by the time delay device imparting a time delay to the signal light beam RSLi; a demultiplexer configured to generate a delayed intermediate frequency signal $V_{IF}'(t)$ and a local signal $V_{LO}'(t)$ by demultiplexing the delayed sum signal $V_{IF+LO}'(t)$; and a mixer configured to generate a delayed radio frequency signal $V_{RF}'(t)$ by multiplying the delayed intermediate frequency signal $V_{IF}'(t)$ by the local signal $V_{LO}'(t)$.

The above configuration makes it possible to provide a transmitting and receiving phased array antenna.

The phased array antenna in accordance with the above embodiments can be preferably arranged such that each feeding circuit Fi further includes: a mixer configured to generate an intermediate frequency signal $V_{IF}'(t+\Delta ti)$ by multiplying (a) a radio frequency signal $V_{RF}'(t+\Delta ti)$ which has been received by use of the corresponding antenna element Ai by (b) the delayed local signal $V_{LO}(t-\Delta ti)$; an optical modulator configured to generate a signal light beam RSLi by carrying out quadrature amplitude modulation by use of the intermediate frequency signal $V_{IF}'(t+\Delta ti)$ and the delayed local signal $V_{LO}(t-\Delta ti)$; an optical demodulator configured to generate a delayed intermediate frequency signal $V_{IF}'(t)$ and a local signal $V_{LO}'(t)$ by demodulating a delayed signal light beam RSL'i, the delayed signal light beam RSL'i being obtained by the time delay device imparting a time delay to the signal light beam RSLi; and a mixer configured to generate a delayed radio frequency signal $V_{RF}'(t)$ by multiplying the delayed intermediate frequency signal $V_{IF}'(t)$ by the local signal $V_{LO}'(t)$.

The above configuration makes it possible to provide a transmitting and receiving phased array antenna.

ADDITIONAL MATTERS

The present invention is not limited to the description of the embodiments or variations above, but may be altered within the scope of the claims. The present invention also encompasses, in its technical scope, any embodiment derived from an appropriate combination of technical means disclosed in differing embodiments or variations.

REFERENCE SIGNS LIST 1 and 2 Phased array antenna
MP Multiplexer
OM Optical modulator
TD Time delay device
Fi Feeding circuit
OEi O/E converter
DPi Demultiplexer
MXi Mixer

The invention claimed is:
1. A phased array antenna comprising:
n (n is an integer of 2 or more) antenna elements A1, A2, . . . and An;
a multiplexer configured to generate a sum signal $V_{IF+LO}(t)$ by adding an intermediate frequency signal $V_{IF}(t)$ and a local signal $V_{LO}(t)$:
an optical modulator configured to generate a signal light beam SL by carrying out intensity modulation on a carrier light beam CL by use of the sum signal $V_{IF+LO}(t)$;
a time delay device configured to generate delayed signal light beams SL'1, SL'2, . . . and SL'n by imparting time delays Δt1, Δt2, . . . and Δtn to the signal light beam SL; and
a feeding circuit group constituted by feeding circuits, each of which is a feeding circuit Fi configured to convert a corresponding delayed signal light beam SL'i into a delayed radio frequency signal $V_{RF}(t-\Delta ti)$ to be supplied to a corresponding antenna element Ai,
each feeding circuit Fi (i=1, 2, . . . n) including:
an O/E converter configured to generate a delayed sum signal $V_{IF+LO}(t-\Delta ti)$ by carrying out O/E conversion on the corresponding delayed signal light beam SL'i;
a demultiplexer configured to generate a delayed intermediate frequency signal $V_{IF}(t-\Delta ti)$ and a delayed local signal $V_{LO}(t-\Delta ti)$ by demultiplexing the delayed sum signal $V_{IF+LO}(t-\Delta ti)$; and
a mixer configured to generate the delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$,
wherein each feeding circuit Fi further includes:
a mixer configured to generate an intermediate frequency signal $V_{IF}'(t+\Delta ti)$ by multiplying (a) a radio frequency signal $V_{RF}'(t+\Delta ti)$ which has been received by use of the corresponding antenna element Ai by (b) the delayed local signal $V_{LO}(t-\Delta ti)$;

a multiplexer configured to generate a sum signal $V_{IF+LO}'(t+\Delta ti)$ by adding the intermediate frequency signal $V_{IF}'(t+\Delta ti)$ and the delayed local signal $V_{LO}'(t-\Delta ti)$;

an optical modulator configured to generate a signal light beam RSLi by carrying out intensity modulation by use of the sum signal $V_{IF+LO}'(t+\Delta ti)$;

an O/E converter configured to generate a delayed sum signal $V_{IF+LO}'(t)$ by carrying out O/E conversion on a delayed signal light beam RSL'i, the delayed signal light beam RSL'i being obtained by the time delay device imparting a time delay to the signal light beam RSLi;

a demultiplexer configured to generate a delayed intermediate frequency signal $V_{IF}'(t)$ and a local signal $V_{LO}'(t)$ by demultiplexing the delayed sum signal $V_{IF+LO}'(t)$; and a mixer configured to generate a delayed radio frequency signal $V_{RF}'(t)$ by multiplying the delayed intermediate frequency signal $V_{IF}'(t)$ by the local signal $V_{LO}'(t)$.

2. The phased array antenna according to claim 1, further comprising:

a light source group constituted by light sources each of which generates a carrier light beam CLi such that each of carrier light beams CL1, CL2, . . . and CLn generated by respective ones of the light sources has a differing wavelength; and a multiplexer configured to generate the carrier light beam CL by multiplexing the carrier light beams CL1, CL2, . . . and CLn;

wherein the time delay device includes:
an optical waveguide configured to generate a delayed signal light beam SL' by causing chromatic dispersion of the signal light beam SL; and
a wavelength demultiplexer configured to generate the delayed signal light beams SL'1, SL'2, . . . and SL'n by carrying out wavelength demultiplexing on the delayed signal light beam SL'.

3. The phased array antenna according to claim 2, wherein each of the light sources is configured to allow for variation of a wavelength of the carrier light beam CLi generated thereby.

4. The phased array antenna according to claim 2, wherein the optical waveguide is configured to allow for variation of the chromatic dispersion caused to the signal light beam SL.

5. The phased array antenna according to claim 1, further including a light source configured to generate the carrier light beam CL, wherein the time delay device includes:
an optical splitter configured to generate signal light beams SL1, SL2, . . . and SLn by splitting the signal light beam SL; and
an optical waveguide group constituted by optical waveguides, each optical waveguide being configured to generate a delayed signal light beam SL'i by imparting a time delay $\Delta ti$ to a corresponding signal light beam SLi such that each of time delays $\Delta t1$, $\Delta t2$, . . . and $\Delta tn$ imparted by respective ones of the optical waveguides is of a differing length.

6. The phased array antenna according to claim 5, wherein:

the light source is configured to allow for variation of a wavelength of the carrier light beam CL generated thereby; and each of the optical waveguides is configured to cause differing chromatic dispersion.

7. The phased array antenna according to claim 5, wherein each of the optical waveguides has a variable optical path length.

8. The phased array antenna according to claim 1, wherein:

instead of including the mixer configured to generate the delayed radio frequency signal $V_{RF}(t-\Delta ti)$ by multiplying the delayed intermediate frequency signal $V_{IF}(t-\Delta ti)$ by the delayed local signal $V_{LO}(t-\Delta ti)$, each feeding circuit Fi includes:

a multiplier configured to generate a delayed local signal $V_{LOM}(t-\Delta ti)$ by multiplying a frequency of the delayed local signal $V_{LO}(t-\Delta ti)$; and a mixer configured to generate the delayed radio frequency signal $V_{RF}(t-\Delta t)$ by multiplying the delayed intermediate frequency signal $V_{IF}(t-\Delta ti)$ by the delayed local signal $V_{LOM}(t-\Delta ti)$.

\* \* \* \* \*